US012684163B2

(12) United States Patent
Oh

(10) Patent No.: US 12,684,163 B2
(45) Date of Patent: Jul. 14, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 18/290,599

(22) PCT Filed: May 9, 2022

(86) PCT No.: PCT/KR2022/006534
§ 371 (c)(1),
(2) Date: Jan. 19, 2024

(87) PCT Pub. No.: WO2023/003144
PCT Pub. Date: Jan. 26, 2023

(65) Prior Publication Data
US 2025/0088659 A1     Mar. 13, 2025

(30) Foreign Application Priority Data

Jul. 20, 2021     (KR) ........................ 10-2021-0095117

(51) Int. Cl.
H04N 19/54          (2014.01)
H04N 19/105         (2014.01)
(Continued)

(52) U.S. Cl.
CPC ........... H04N 19/54 (2014.11); H04N 19/105 (2014.11); H04N 19/167 (2014.11);
(Continued)

(58) Field of Classification Search
CPC .... H04N 19/54; H04N 19/105; H04N 19/167; H04N 19/172; H04N 19/196; H04N 19/597
See application file for complete search history.

(56) References Cited

U.S. PATENT DOCUMENTS 6,349,297 B1 *   2/2002   Shaw ................... H04N 21/426
8,559,518 B2 *  10/2013   Chappalli .............. H04N 5/145
                                                         375/240.16
(Continued)

FOREIGN PATENT DOCUMENTS

CN        11409573      *   8/2020   ............. H04N 19/52
CN        114095735     *   8/2020
(Continued)

OTHER PUBLICATIONS

Li translation of CN 11409573 Aug. 24, 2020 (Year: 2020).*
(Continued)

*Primary Examiner* — Zaihan Jiang
(74) *Attorney, Agent, or Firm* — Fish & Richardson P.C.

(57)          ABSTRACT

A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

7 Claims, 34 Drawing Sheets

(51) Int. Cl.

| | |
|---|---|
| *H04N 19/167* | (2014.01) |
| *H04N 19/172* | (2014.01) |
| *H04N 19/196* | (2014.01) |
| *H04N 19/597* | (2014.01) |

(52) U.S. Cl.
CPC ......... *H04N 19/172* (2014.11); *H04N 19/196* (2014.11); *H04N 19/597* (2014.11)

(56) References Cited

U.S. PATENT DOCUMENTS

| | | | |
|---|---|---|---|
| 2002/0135681 A1* | 9/2002 | Lo ......................... | H04N 5/144 348/208.7 |
| 2011/0047155 A1* | 2/2011 | Sohn .................... | H04N 19/134 707/E17.014 |
| 2017/0347120 A1 | 11/2017 | Chou et al. | |
| 2020/0258262 A1 | 8/2020 | Lasserre et al. | |
| 2021/0099711 A1* | 4/2021 | Tourapis .............. | H04N 19/147 |
| 2021/0142521 A1* | 5/2021 | Iguchi .................... | H04N 19/70 |
| 2021/0192798 A1 | 6/2021 | Lasserre et al. | |
| 2021/0217206 A1* | 7/2021 | Flynn ...................... | G06T 7/593 |
| 2023/0290006 A1* | 9/2023 | Hur ........................... | G06T 9/00 |
| 2023/0316581 A1* | 10/2023 | Lee ........................ | H04N 19/57 375/240.01 |
| 2023/0328270 A1* | 10/2023 | Lee ........................... | G06T 9/40 375/240.16 |
| 2024/0205451 A1* | 6/2024 | Kidani ................. | H04N 19/577 |
| 2024/0267525 A1* | 8/2024 | Zhao ..................... | H04N 19/137 |
| 2025/0022183 A1* | 1/2025 | Lasserre ................. | G06T 7/251 |

FOREIGN PATENT DOCUMENTS

| | | | | |
|---|---|---|---|---|
| CN | 112565764 | | 3/2021 | |
| CN | 116529769 | * | 10/2021 | |
| EP | 4325853 A1 | | 2/2024 | |
| WO | WO 2020197966 | | 10/2020 | |
| WO | WO-2021062743 A1 | * | 4/2021 | ............ G06T 9/004 |

OTHER PUBLICATIONS

Li translation of CN 114095735 Aug. 24, 2020 (Year: 2020).*
Xi translation of CN 116529769 Oct. 5, 2021 (Year: 2021).*
Zhang, Wei translation of WO 2021062743 A1 Sep. 30, 2019 (Year: 2019).*
International Search Report and Written Opinion in International Appln. No. PCT/KR2022/006534, mailed on Aug. 22, 2022, 16 pages (with English translation).
3DG, "PCC Test Model Category 3 v1," ISO/IEC JTC1/SC29/WG11, N17349, Jan. 2018, Gwangju, Republic of Korea, 8 pages.
Extended European Search Report in European Appln. No. 22846016.8, mailed on Sep. 23, 2024, 12 pages.
Lasserre et al., "[PCC] An overview of OBUF and neighbour usage for geometry coding," ISO/IEC JTC1/SC29/WG11 MPEG2018/m45811, Jan. 2019, Marrakesh, Morrocco, 15 pages.
Lasserre et al., "[PCC] How to use a predictive set of points for geometry coding in TMC3," ISO/IEC JTC1/SC29/WG11 MPEG2018/m42520, Apr. 2018, San Diego, CA, US, 8 pages.
Lasserre et al., "[PCC] Neighbour-dependent entropy coding of occupancy patterns in TMC3," ISO/IEC JTC1/SC29/WG11 MPEG2018/m42238, Jan. 2018, Gwangju, Korea, 11 pages.
Lasserre et al., "On motion compensation for geometry coding in TM3," MPEG 122, San Diego, Apr. 2018, m42521, 26 pages.

* cited by examiner

FIG. 7
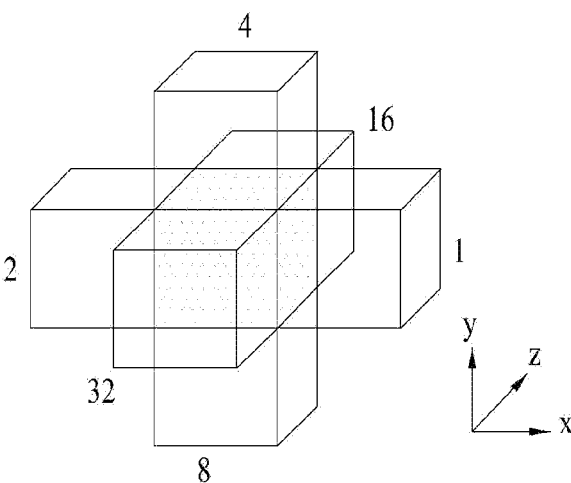
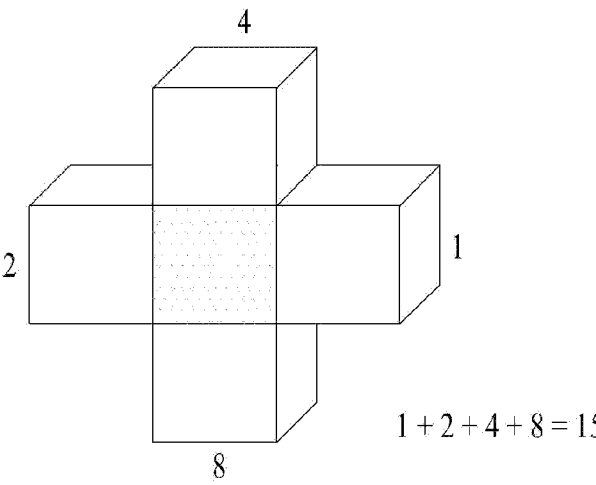
$$1 + 2 + 4 + 8 = 15$$

Level of details $$D(B, Bn, P, Pn) = \sum_{b \in B, bn \in Bn} \log_2(1 + \min_{p \in P}\{\|b(x, y, z) - p(x, y, z)\|_L + w\|bn(x, y, z) - pu(x, y, z)\|_L\})$$

$$V(x, y, z) = B(x, y, z) - P(x, y, z)$$

$$C(V) = D(B, P(W, V) + \lambda R(V)$$

FIG. 17
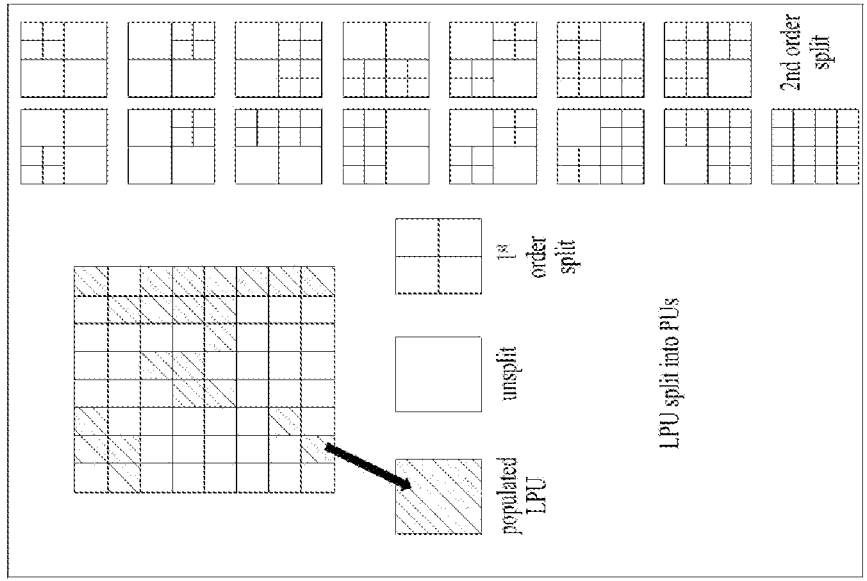
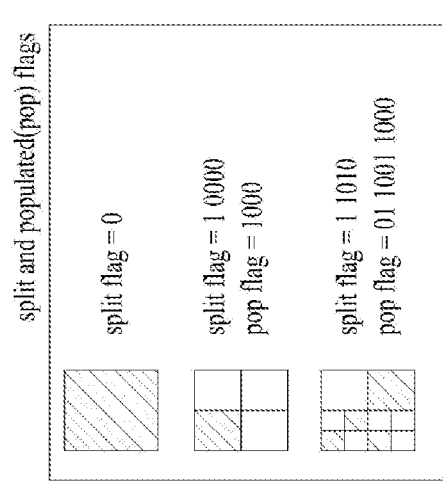

FIG. 18

$$D(V) = \sum_i D(B, P(W, V_i)) + \lambda_1 R(V_i) + \lambda_2 R(\text{split/populatoin flags})$$

$$C(V_1) = D(V_1) + \mu E(V_1) + \lambda R(V_1)$$

$$C = C(V_1) + C(V_4) + \lambda R_{\text{split}}(10000) + \lambda R_{\text{pop}}(1001)$$

$$C(V_4) = D(V_4) + \mu E(V_4) + \lambda R(V_4)$$

$$P(x, y, z) = B(x, y, z) + V(x, y, z)$$

Occupancy of B' = occupancy of P $$b'(x, y, z) = p(x, y, z) - V(x, y, z)$$

predictor P
In the reference frame predicted block B'
In the current frame

V

20000

FIG. 21
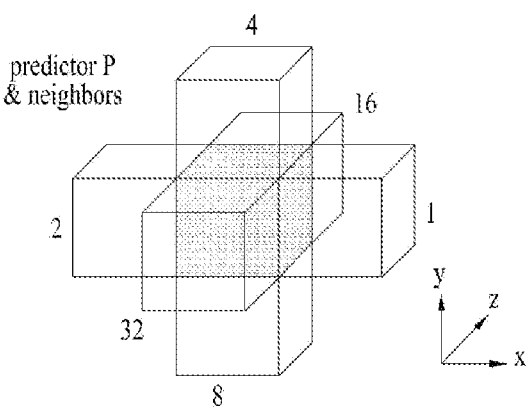
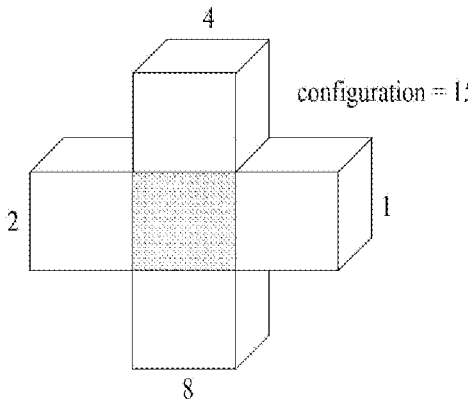

FIG. 23

PU block B
& neighbors predictor P
& neighbors

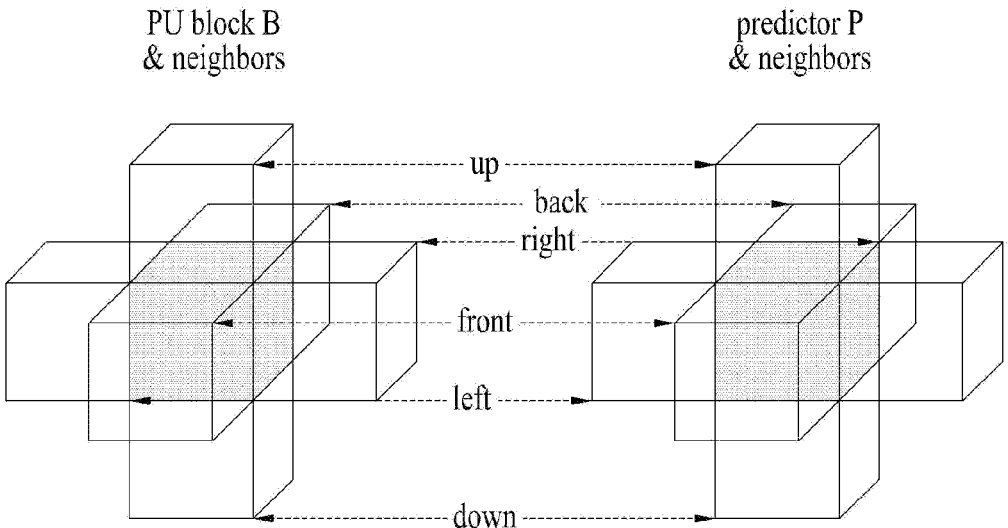

FIG. 24 neighbor occupancy comparison flag (n) = 1
            if PU neighbor occupancy flag (n) = Predictor neighbor occupancy flag (n)
neighbor occupancy comparison flag (n) = 0
            if PU neighbor occupancy flag (n) =/= Predictor neighbor occupancy flag (n)

neighbor occupancy score 1 = sum_n (neighbor occupancy comparison flag (n) << n)

neighbor occupancy score 2 = sum_n (neighbor occupancy comparison flag (n))

neighbor occupancy score 3 = sum_n (neighbor occupancy comparison flag (n))
            if PU neighbor occupancy flag (n) = 1 neighbor occupancy score 4 = sum_n (neighbor occupancy comparison flag (n))
            if PU neighbor occupancy flag (n) = 0

FIG. 25
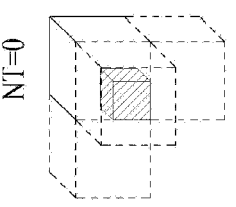
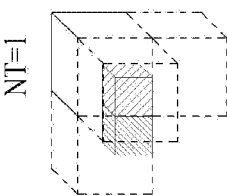
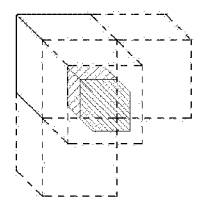
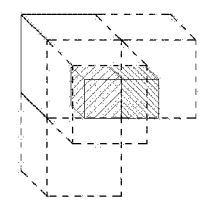
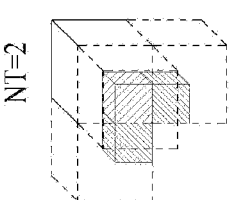
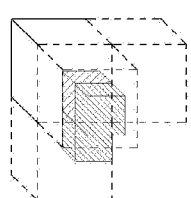
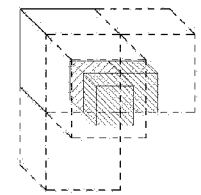
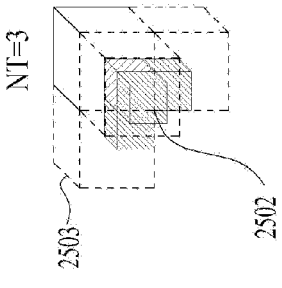
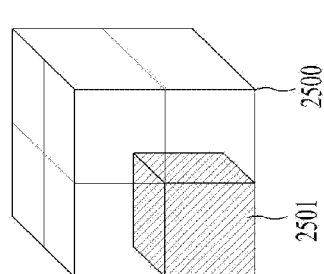

FIG. 27

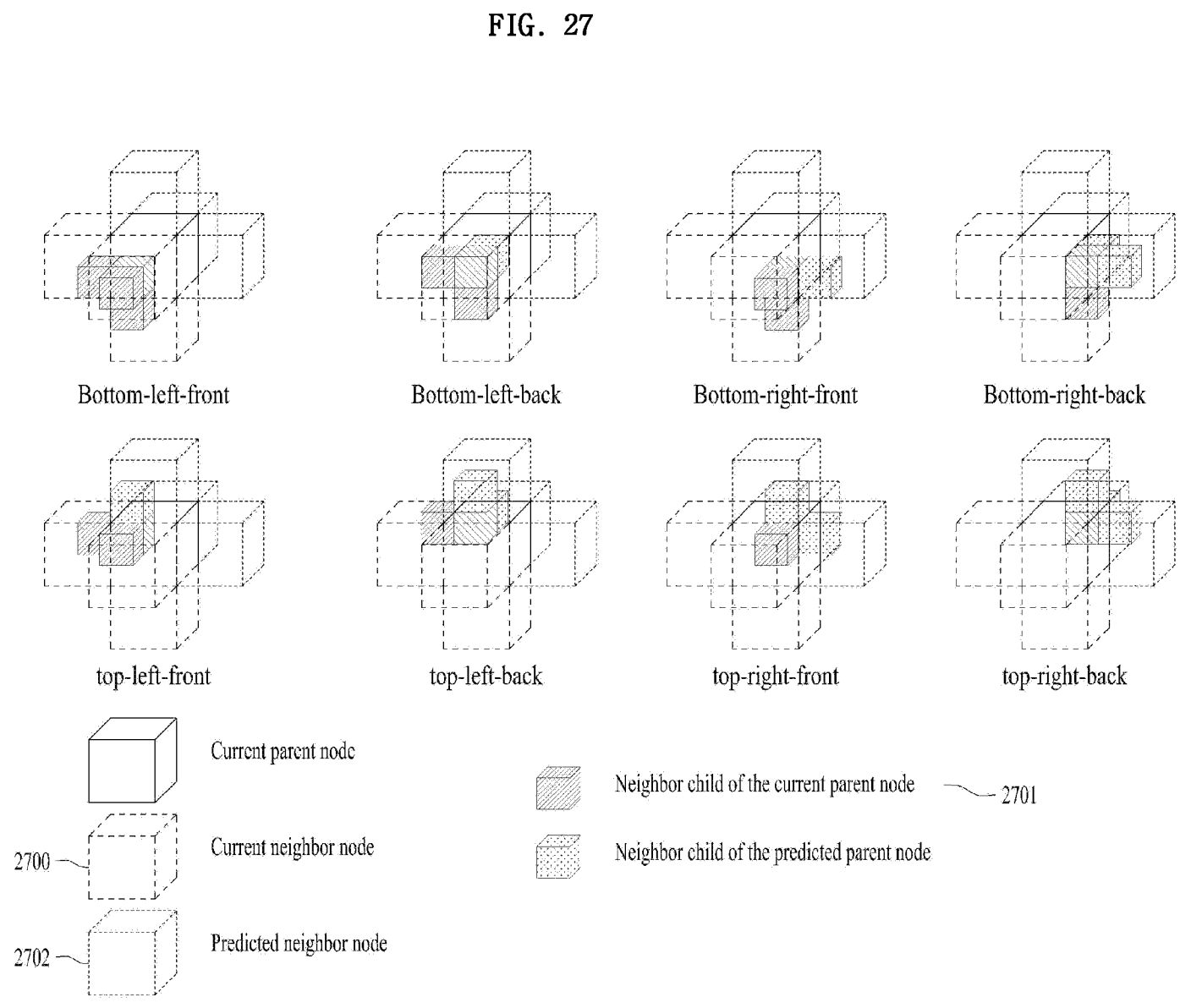

Bottom-left-front

Bottom-left-back

Bottom-right-front

Bottom-right-back top-left-front top-left-back top-right-front top-right-back

— 2701

Neighbor child of the current parent node

Neighbor child of the predicted parent node

Current parent node

Current neighbor node

Predicted neighbor node

Bottom-right-back top-right-back

Bottom-right-front top-right-front

Bottom-left-back top-left-back

Bottom-left-front top-left-front child of the current parent node

Figure 29:
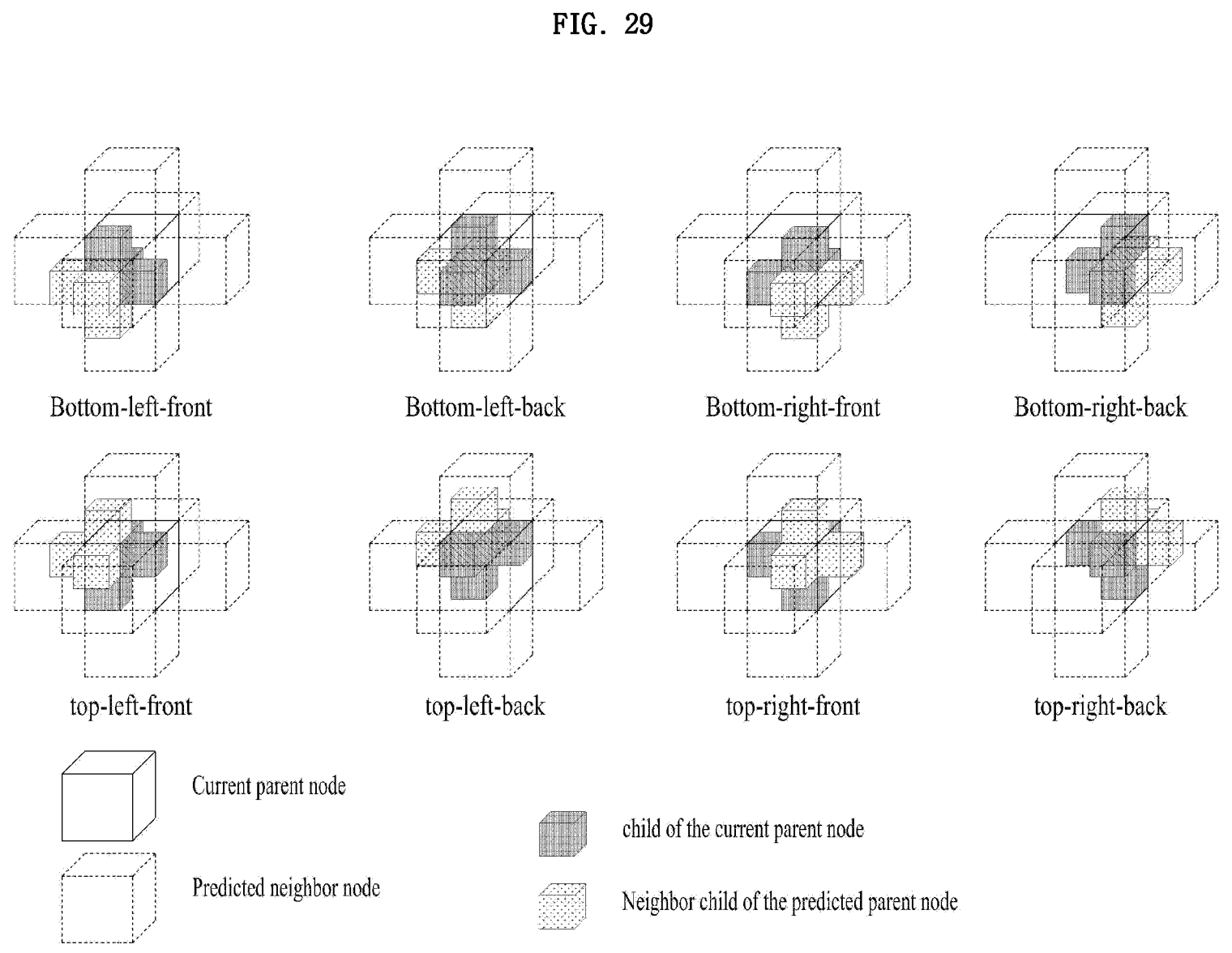

Neighbor child of the predicted parent node

Current parent node

Predicted neighbor node

FIG. 30

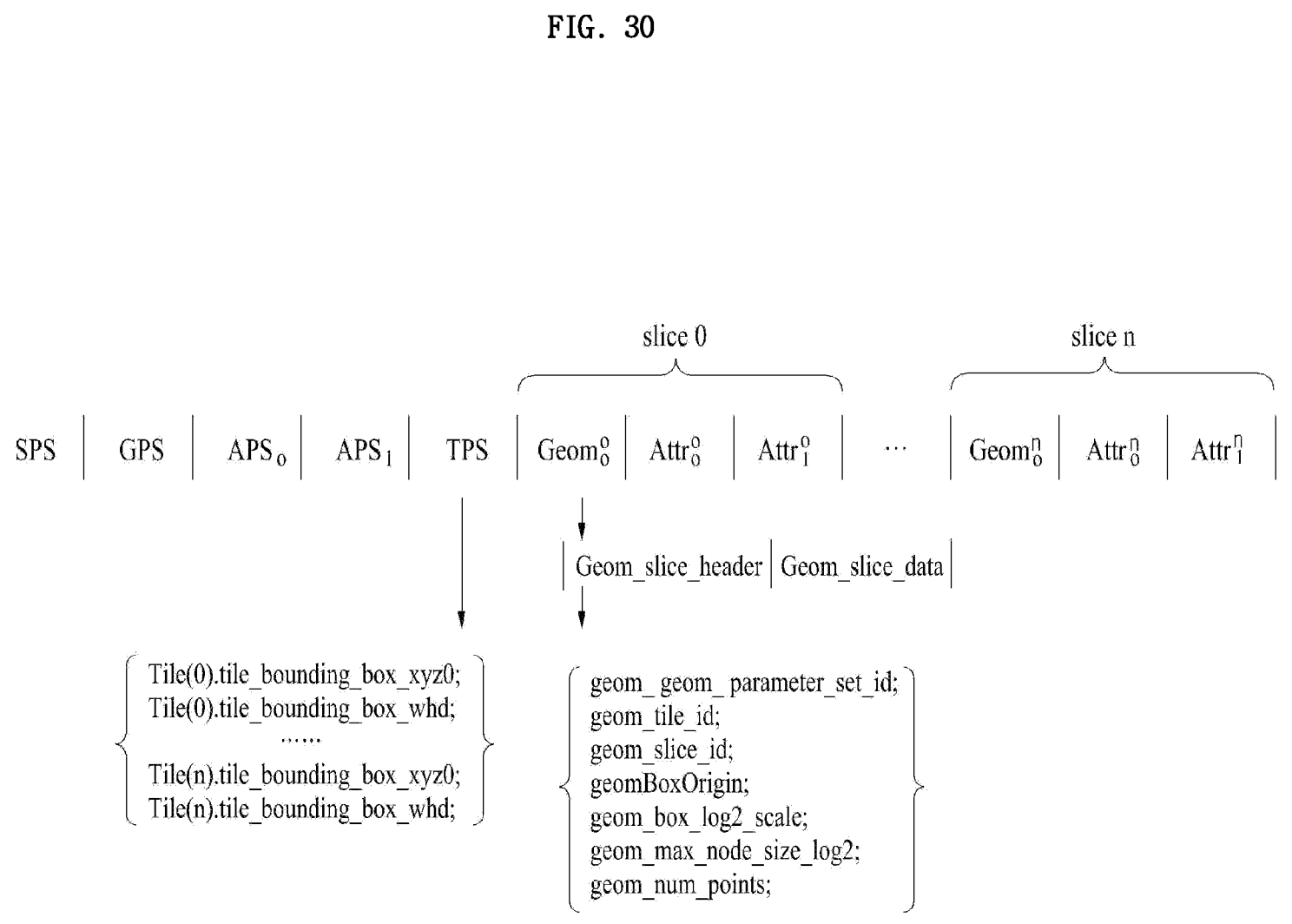

| SPS | GPS | APS$_0$ | APS$_1$ | TPS |
|---|---|---|---|---| slice 0

| Geom$_0^0$ | Attr$_0^0$ | Attr$_1^0$ |
|---|---|---|

...

slice n

| Geom$_0^n$ | Attr$_0^n$ | Attr$_1^n$ |
|---|---|---|

| Geom_slice_header | Geom_slice_data |
|---|---| geom_geom_parameter_set_id;
geom_tile_id;
geom_slice_id;
geomBoxOrigin;
geom_box_log2_scale;
geom_max_node_size_log2;
geom_num_points;

Tile(0).tile_bounding_box_xyz0;
Tile(0).tile_bounding_box_whd;
......
Tile(n).tile_bounding_box_xyz0;
Tile(n).tile_bounding_box_whd;

FIG. 31

| geometry_parameter_set ( ) { | Descriptor |
|---|---|
| ...... | |
| predictor_neighbor_enabled_flag | u(1) |
| if(predictor_neighbor_enabled_flag) | |
| predictor_neighbor_type | u(8) |
| inter_predicted_neighbor_child_occupancy_enabled_flag | u(1) |
| if(inter_predicted_neighbor_child_occupancy_enabled_flag) | |
| inter_predicted_neighbor_child_occupancy_type | u(8) |
| ...... | |
| } | |

FIG. 32

| data_unit_header ( ) { | Descriptor |
|---|---|
| ...... | |
| ref_frame_id | u(8) |
| mv_depth_start | u(8) |
| mv_depth_end | u(8) |
| ...... | |
| } | |

FIG. 33

| data_unit ( ) { | Descriptor |
|---|---|
| ...... | |
| for (i = mv_depth_start; i < maxDepth; i++) { | |
| for(j = all nodes in depth i) { | |
| if (i <= mv_depth_end && parentSplitFlag == 1) { | |
| split_flag[i][j] | u(1) |
| if(split_flag[i][j] == 0) { | |
| population_flag[i][j] | u(1) |
| if(population_flag[i][j] == 1) { | |
| for(k=0; k<3; k++) | |
| motion_vector[i][j][k] | u(8) |
| } | |
| } | |
| } | |
| occupancy_map[i][j] | ae(v) |
| } | |
| } | |
| ...... | |
| } | |

FIG. 35

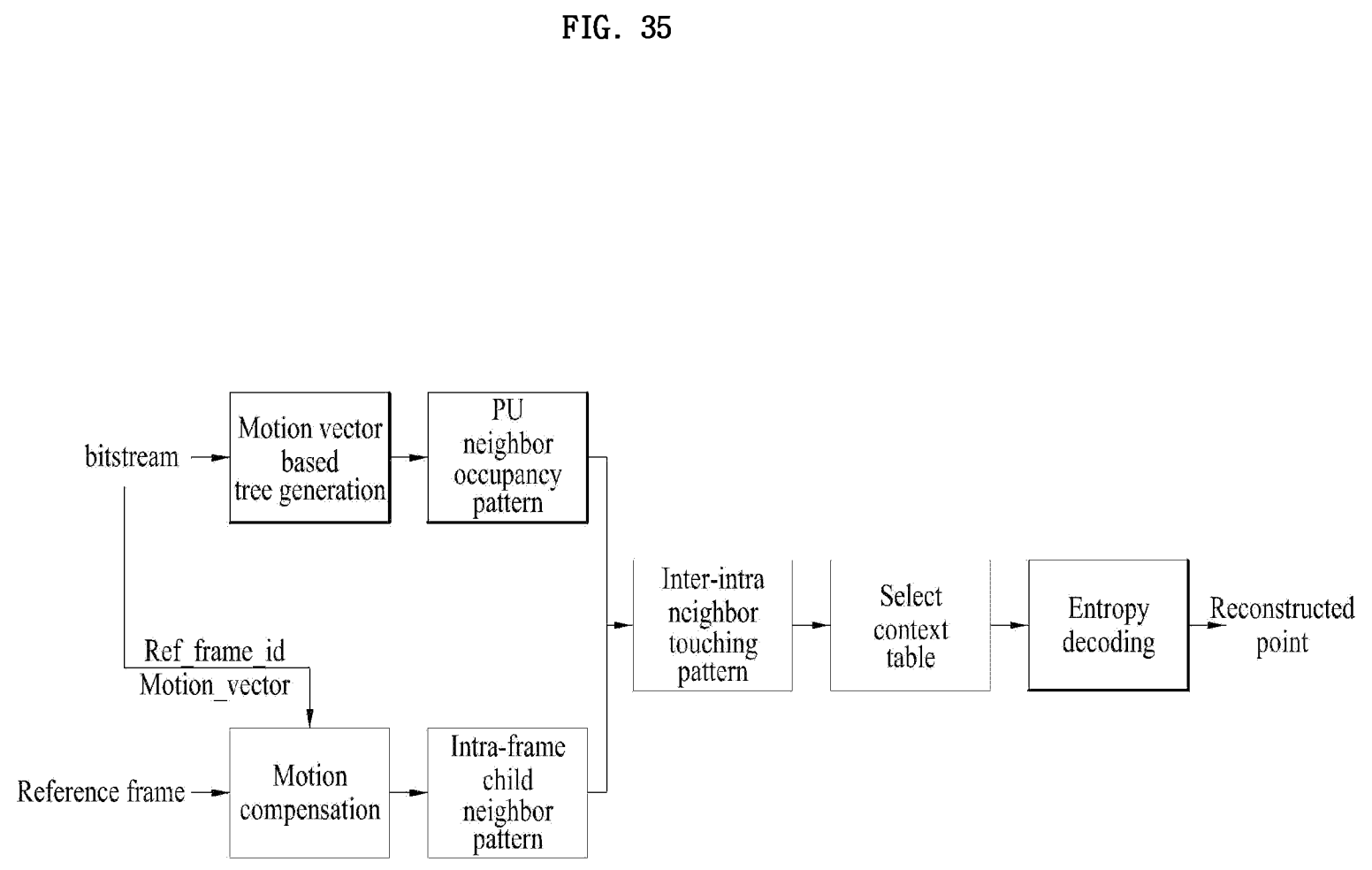

```
bitstream ──►  Motion vector   ──►  PU          
               based                neighbor    
               tree generation      occupancy   
                                    pattern      
                                         │
                                         ▼
                              Inter-intra
                              neighbor
                              touching
                              pattern
                                    │
                                    ▼
                              Select
                              context
                              table
                                    │
                                    ▼
                              Entropy     ──► Reconstructed
                              decoding          point Ref_frame_id
Motion_vector ──►  Motion        ──►  Intra-frame
                   compensation       child
                                      neighbor
Reference frame ──►                   pattern
```

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/006534, filed on May 9, 2022, which claims the benefit of Korean Application No. 10-2021-0095117, filed on Jul. 20, 2021. The disclosures of the prior applications are incorporated by reference in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

According to embodiments, a method of transmitting point cloud data may include encoding point cloud data, and transmitting a bitstream containing the point cloud data. According to embodiments, a method of receiving point cloud data may include receiving a bitstream containing point cloud data, and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 7 shows an example of a neighbor node pattern according to embodiments;

FIG. 17 illustrates motion vector transmission for an octree depth according to embodiments;

FIG. 18 illustrates a cost function according to embodiments;

FIG. 21 illustrates motion estimation considering neighbor occupancy according to embodiments;

FIG. 23 illustrates a neighbor occupancy comparison score according to embodiments;

FIG. 24 illustrates a neighbor occupancy comparison process according to embodiments;

FIG. 25 illustrates a neighbor child occupancy pattern according to embodiments;

FIG. 27 illustrates a neighbor child occupancy pattern according to embodiments;

FIG. 29 illustrates a neighbor child occupancy pattern according to embodiments;

FIG. 30 illustrates a bitstream structure according to embodiments;

FIG. 31 illustrates a geometry parameter set according to embodiments;

FIG. 32 illustrates a data unit header according to embodiments;

FIG. 33 illustrates a data unit according to embodiments;

FIG. 35 illustrates a point cloud data reception device according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
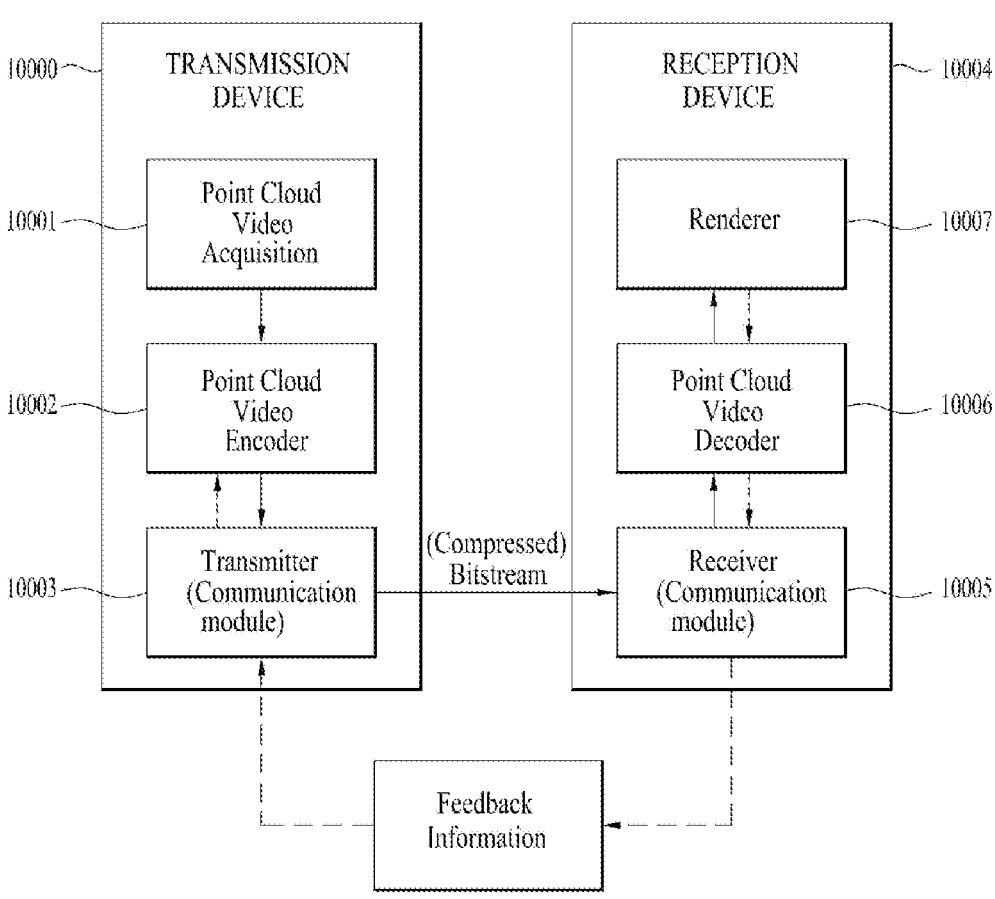
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process to the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
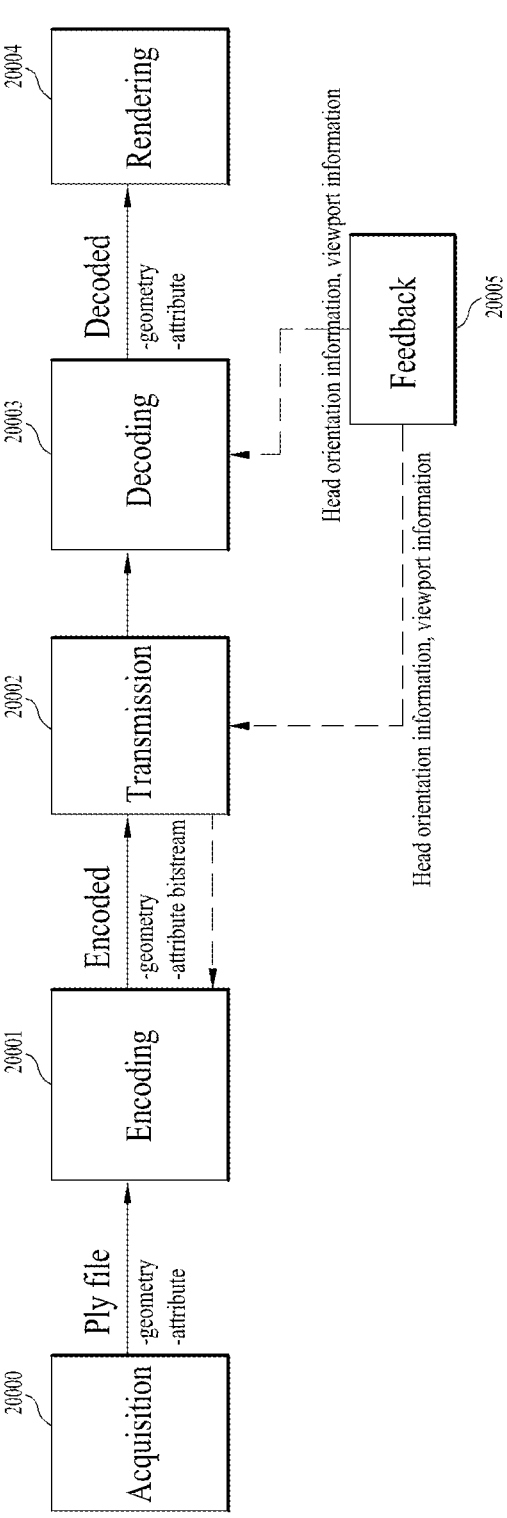
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
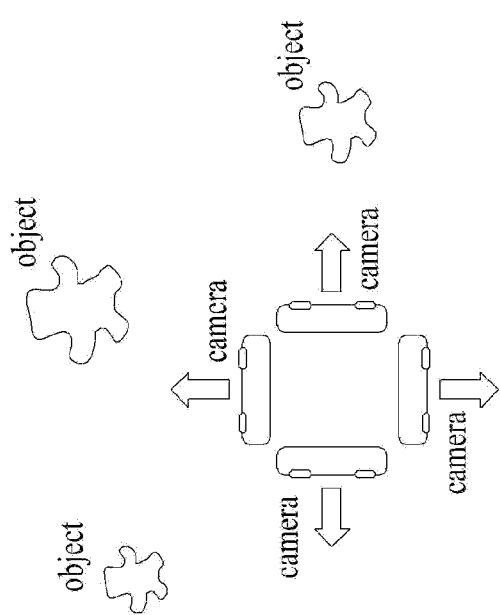
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
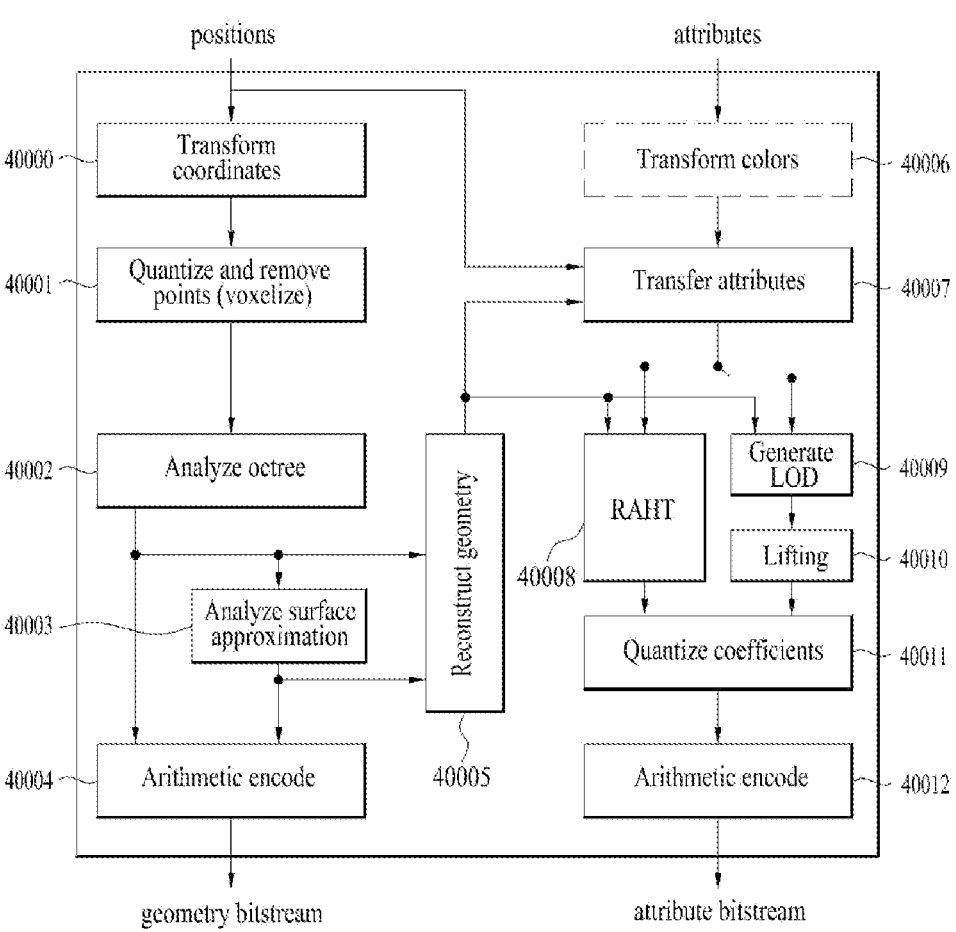
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
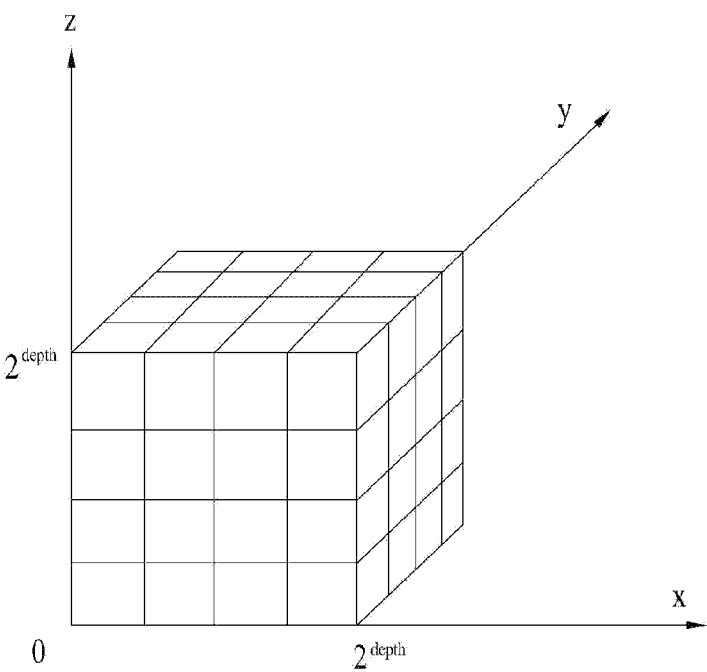
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/ video. The details of the voxel are the same as those described with reference to FIG. 4, and therefore a description thereof is omitted.

Figure 6:
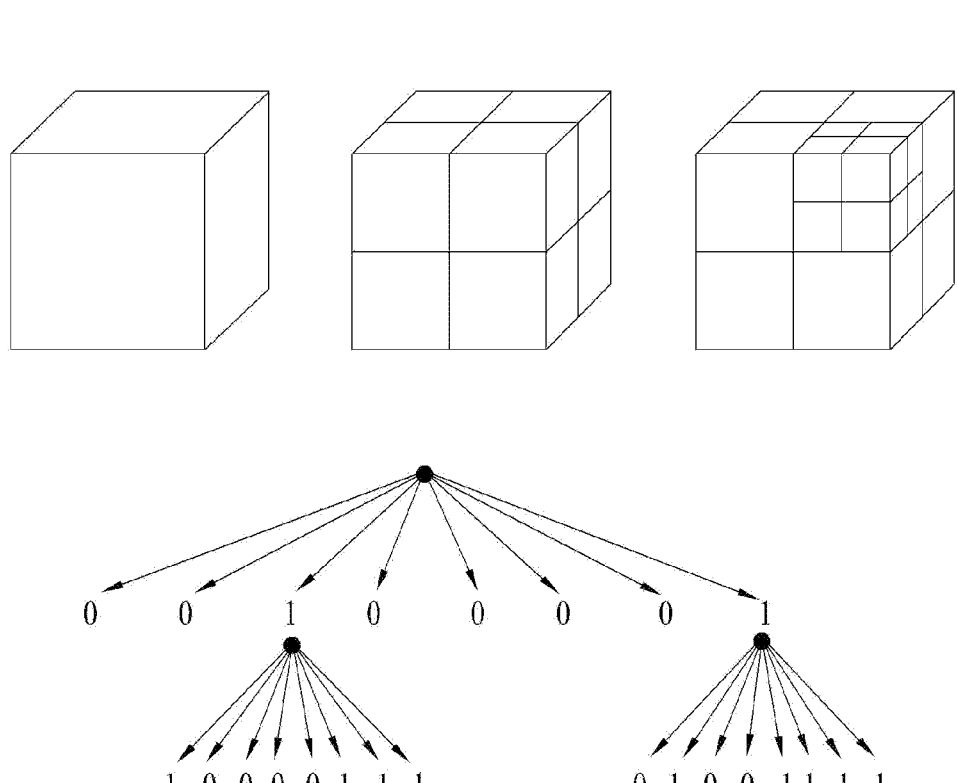
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = Ceil\left(Log2\left(Max\left(x^{int}_n, y^{int}_n, z^{int}_n, n = 1, ..., N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$i) \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad ii) \begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad iii) \begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix}.$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through atan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n | |
| --- | --- |
| n | triangles |
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
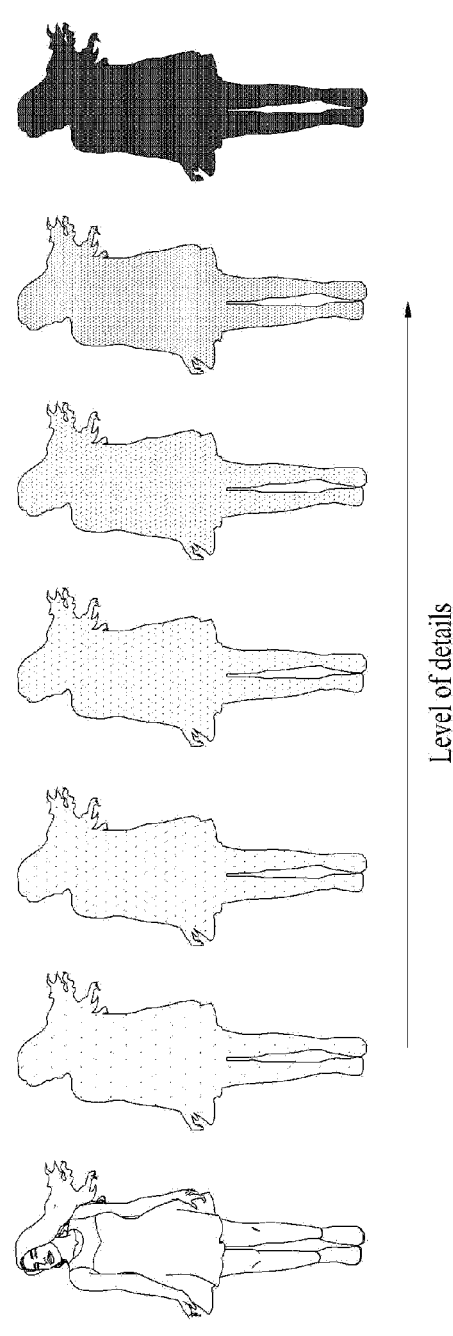
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (or reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
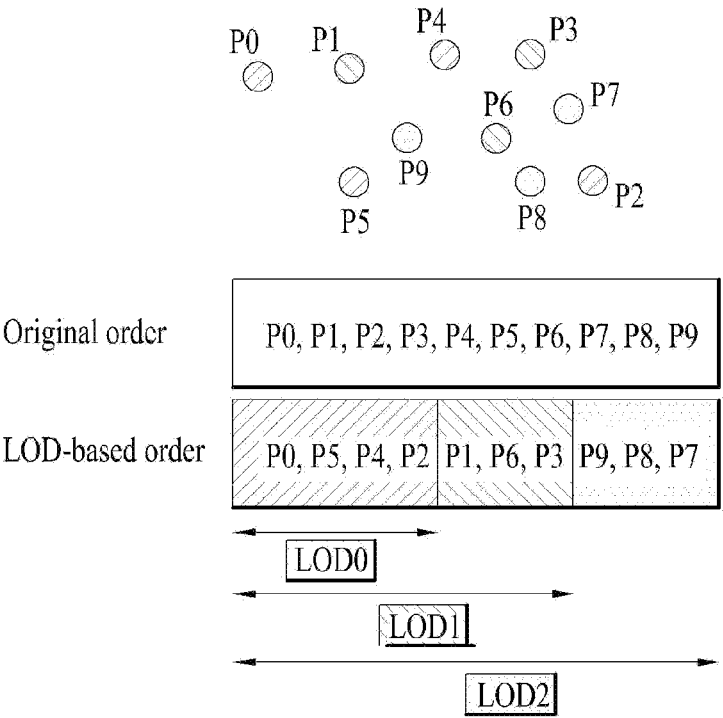
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

```
Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE

```
Attribute prediction residuals inverse quantization pseudo code
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1\,w2} \begin{bmatrix} g_{l_{2x,y,z}} \\ g_{l_{2x+1,y,z}} \end{bmatrix}, \; T_{w1\,w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
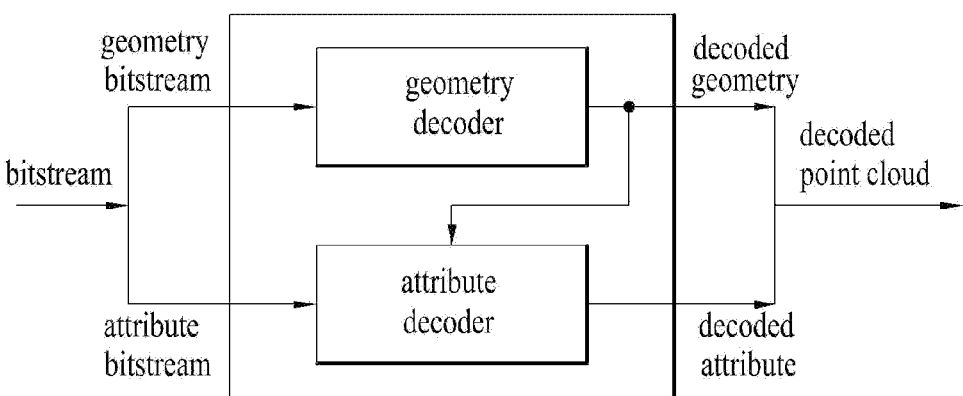
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
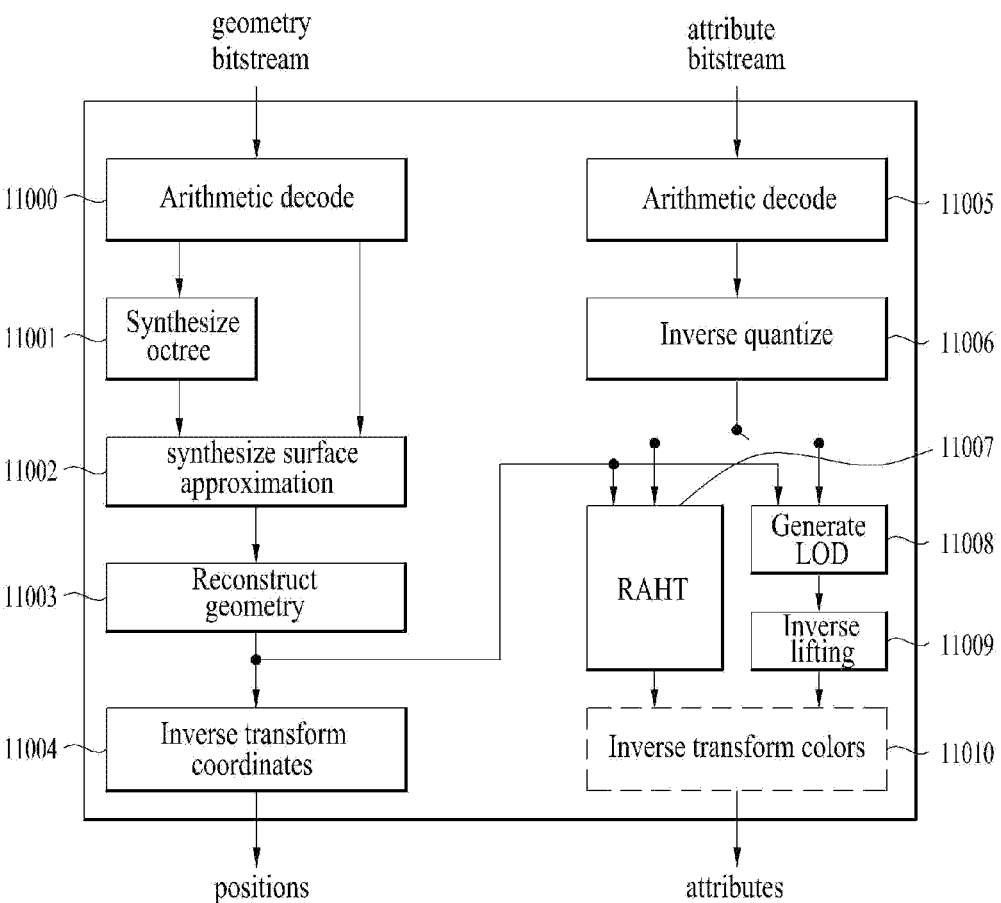
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process to the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process to the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the reverse process to the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
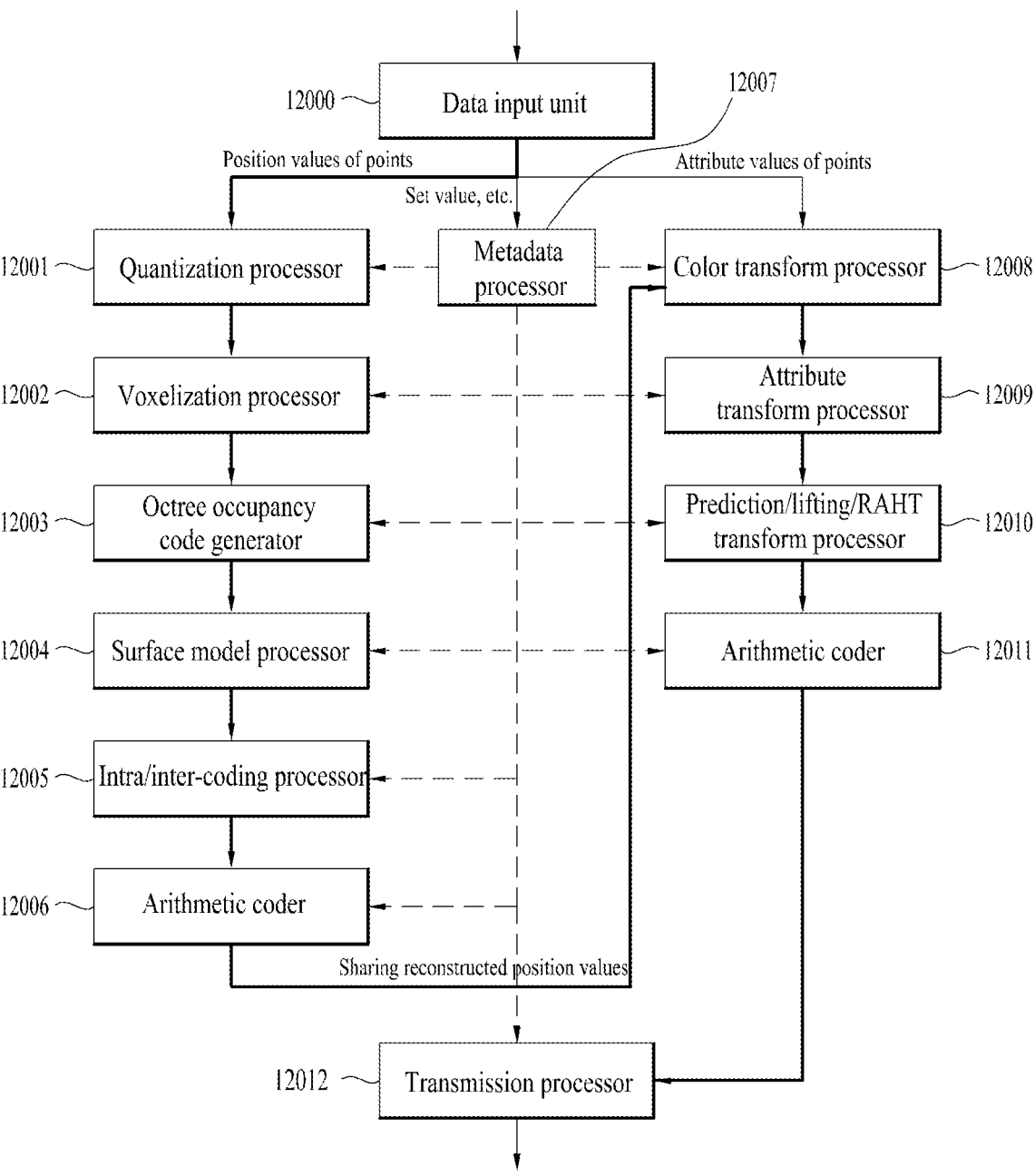
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
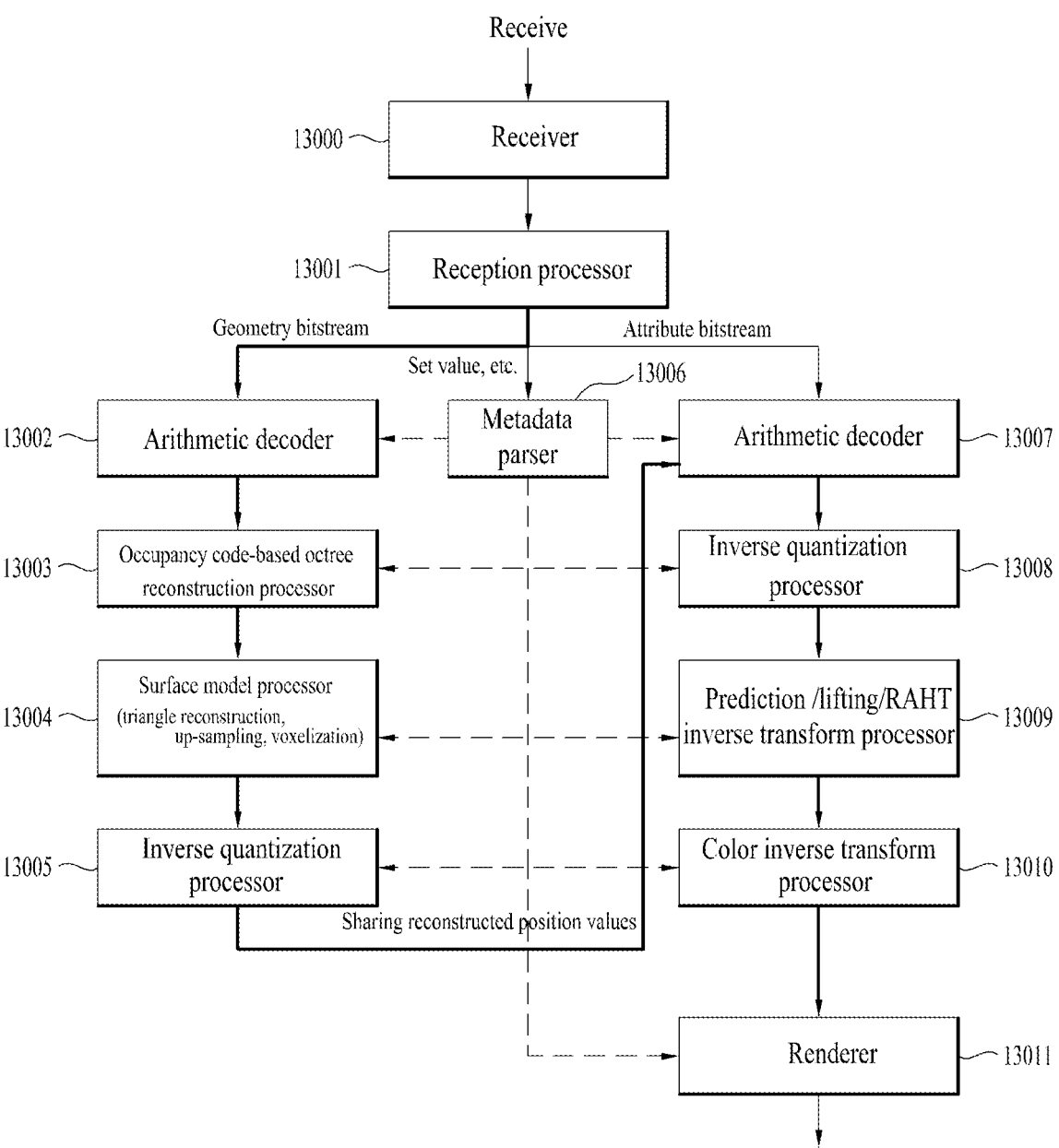
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process to the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
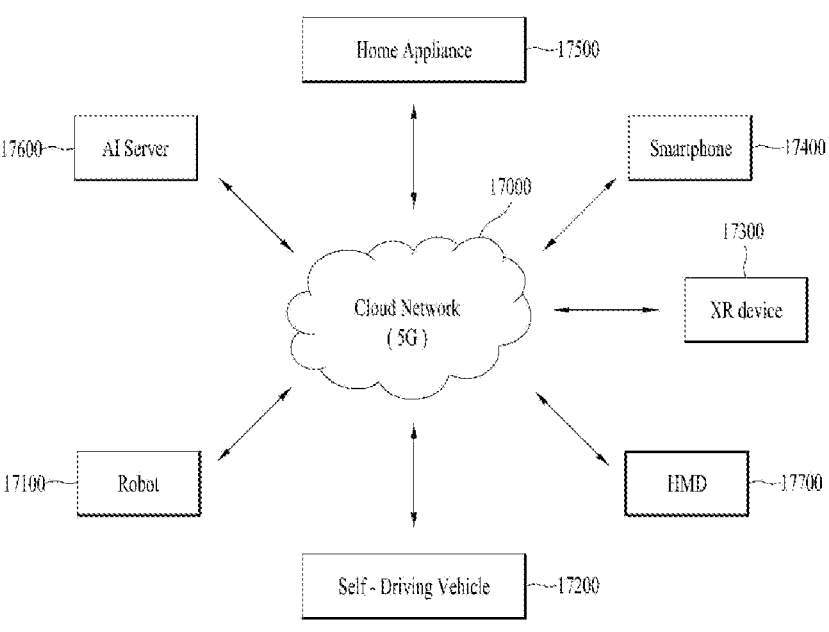
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image ofa real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figures 15, 16:
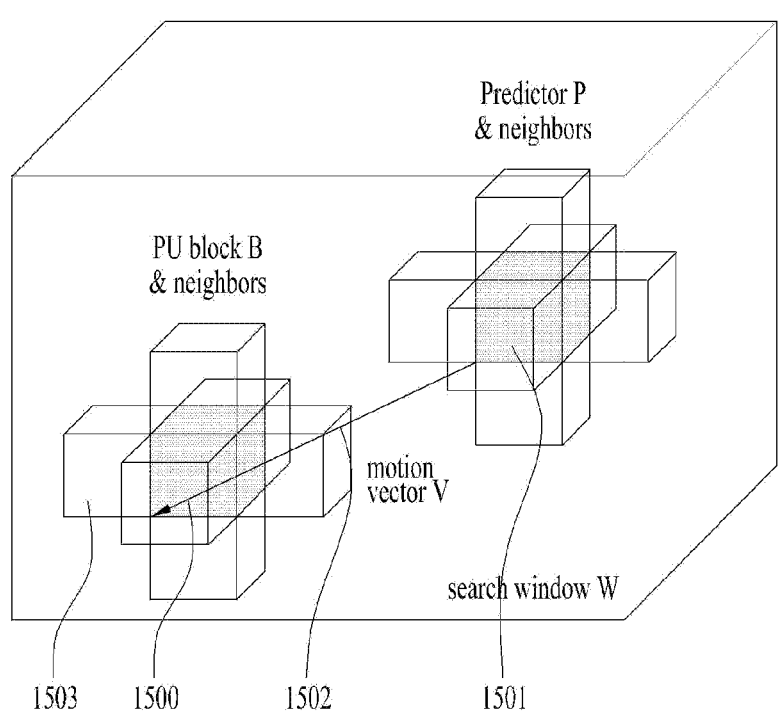
FIG. 15 illustrates a search window of a reference frame according to embodiments.
FIG. 16 illustrates a motion estimation process according to embodiments.
Figure 34:
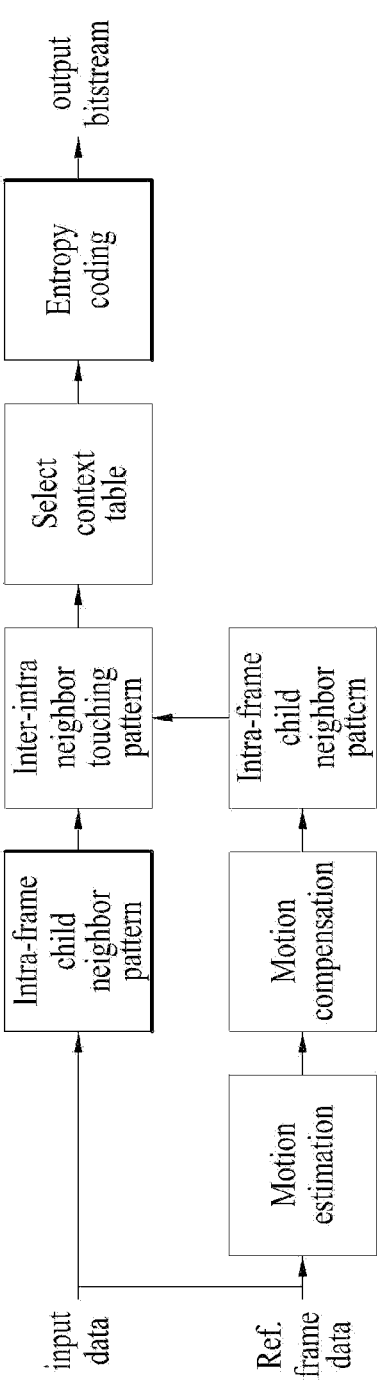
FIG. 34 illustrates a point cloud data transmission device according to embodiments.
Figure 38:
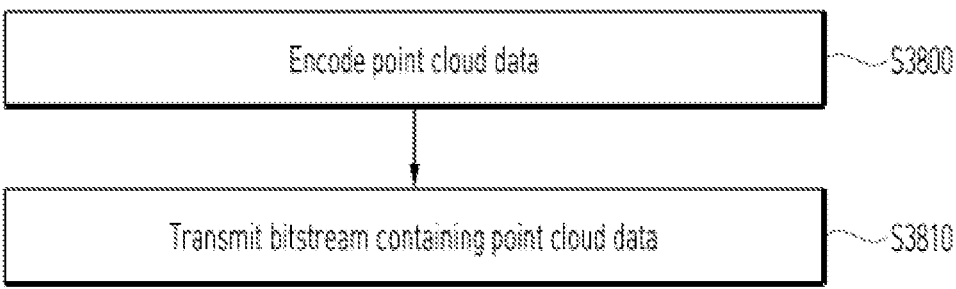
FIG. 38 illustrates a point cloud data transmission method according to embodiments.

The point cloud data transmission method/device according to embodiments is construed as a term referring to the transmission device 10000, point cloud video encoder 10002, and transmitter 10003 of FIG. 1, the acquisition 20000/encoding 20001/transmission 20002 of FIG. 2, the encoder of FIG. 4, the transmission device of FIG. 12, the device of FIG. 14, the encoder of FIGS. 15 and 34, the transmission method of FIG. 38, and the like.

Figure 37:
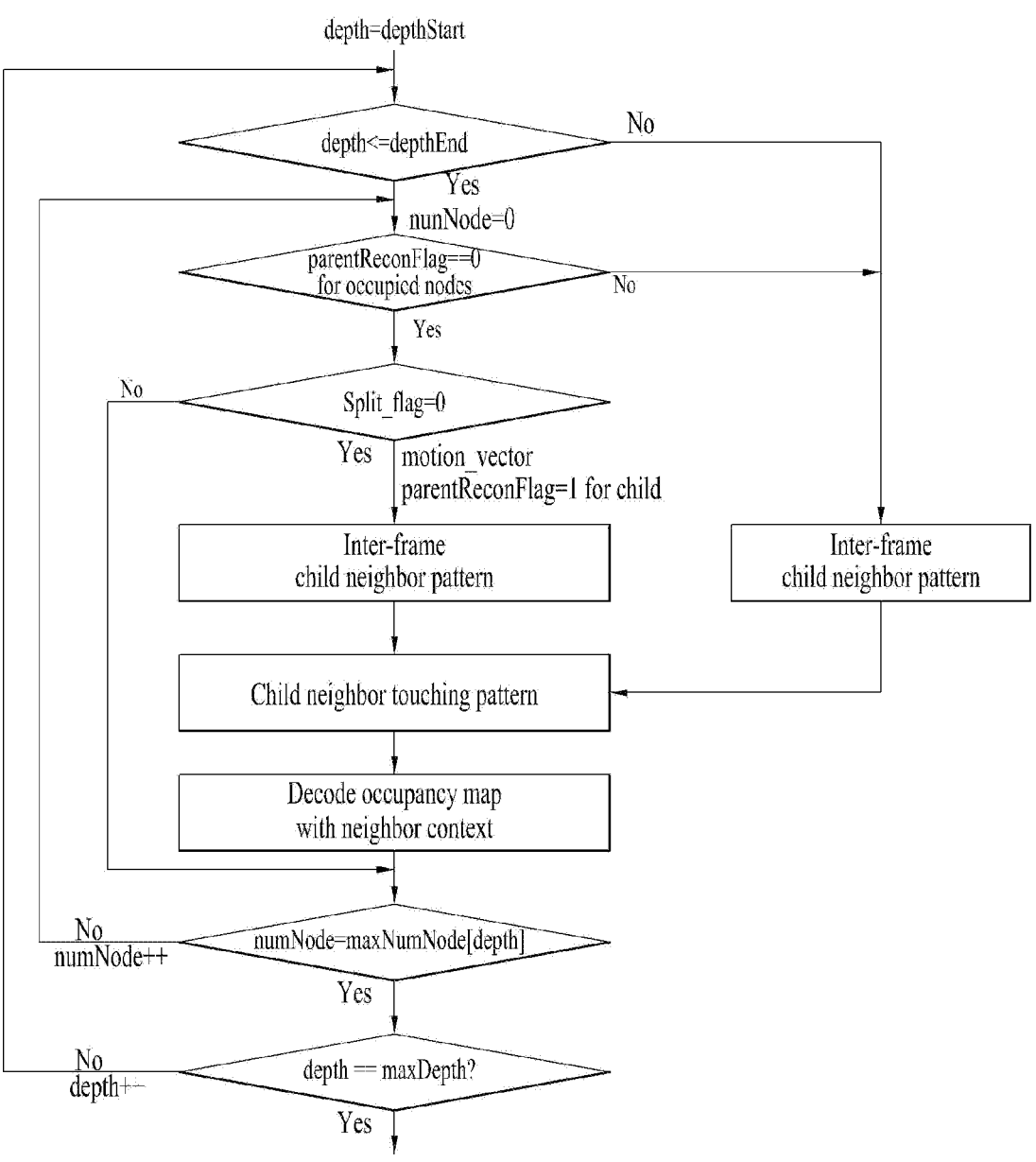
FIG. 37 illustrates a point cloud data reception method according to embodiments.
Figure 39:
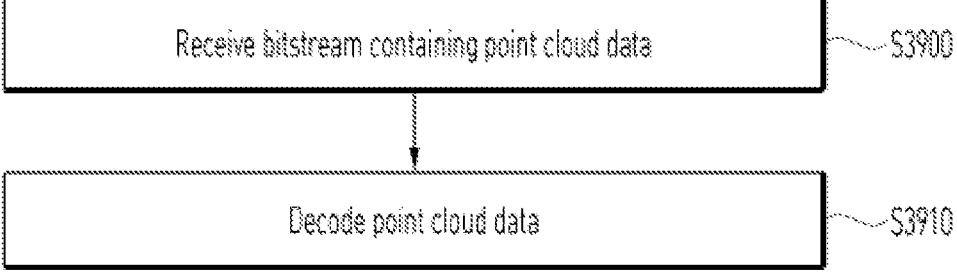
FIG. 39 illustrates a point cloud data reception method according to embodiments.

The point cloud data reception method/device according to embodiments is construed as a term referring to the reception device 10004, receiver 10005, and point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIGS. 15 and 35, the decoding of FIG. 37, and the reception method of FIG. 39, and the like.

The point cloud data transmission/reception method/device according to the embodiments may be referred to as a method/device according to the embodiments.

According to embodiments, geometry data, geometry information, position information, and the like constituting the point cloud data are construed as having the same meaning. Attribute data, attribute information, and the like constituting point cloud data are construed as having the same meaning.

The method/device according to embodiments may perform inter- and intra-frame child neighbor correlation based geometry coding.

As a method for efficiently compressing point cloud data to provide a service, embodiments may include an octree-based compression/reconstruction method. In this case, redundant information may be removed based on the inter-frame correlation to increase the compression efficiency.

Embodiments include techniques for compressing/reconstructing point cloud data. More particularly, embodiments provide a method for improving compression/reconstruction efficiency based on similarity between different frames in terms of information.

Referring to FIGS. 4 and 11, the point cloud data includes geometry information (e.g. xyz coordinates) and attribute information (e.g. color, reflectance, etc.) related to each data. Methods of compressing the geometry information and the attribute information for efficient compression have been studied. An octree-based compression method is used in compressing the geometry information, and then the attribute information is compressed based on the compressed data.

Position compression (or geometry compression or geometry encoding) defined in the current standard is a method of reducing similarity between points in a current frame. However, when consecutive frames are configured, the correlation between adjacent frames is high, and thus high coding efficiency may be obtained by removing the redundant information based on the correlation. In particular, in considering the neighbor correlation, occupancy information about a neighbor child node may be used.

Embodiments may provide an inter-frame and inter-layer correlation based geometry coding method.

Compression efficiency may be improved using a child level neighbor occupancy pattern of a predicted node present in a previous frame, and a child level neighbor node occupancy rate of an uncoded neighbor may be predicted based on a neighbor occupancy pattern of a previous frame.

Embodiments disclose a method for increasing the compression efficiency of a geometry compression method in point cloud compression. Geometry compression according to embodiments is context-based compression and improves a method of predicting a probability based on related information when compressing a compression target node. In this case, when the motion between adjacent frames is not large, the similarity between the compression target node and the predicted node as well as the similarity between the neighbor node of the compression target node and the neighbor node of the predicted node may be assumed. Based on the assumption, occupancy information about the neighbor node of the predicted node may be additionally used together with occupancy information about the predicted node, and compression efficiency may be increased based on the additional information. In using the motion prediction-based compression method according to the embodiments, a method for increasing compression efficiency based on occupancy information about a neighbor node may be provided.

FIG. 15 illustrates a search window of a reference frame according to embodiments.

FIG. 16 illustrates a motion estimation process according to embodiments.

Figure 36:
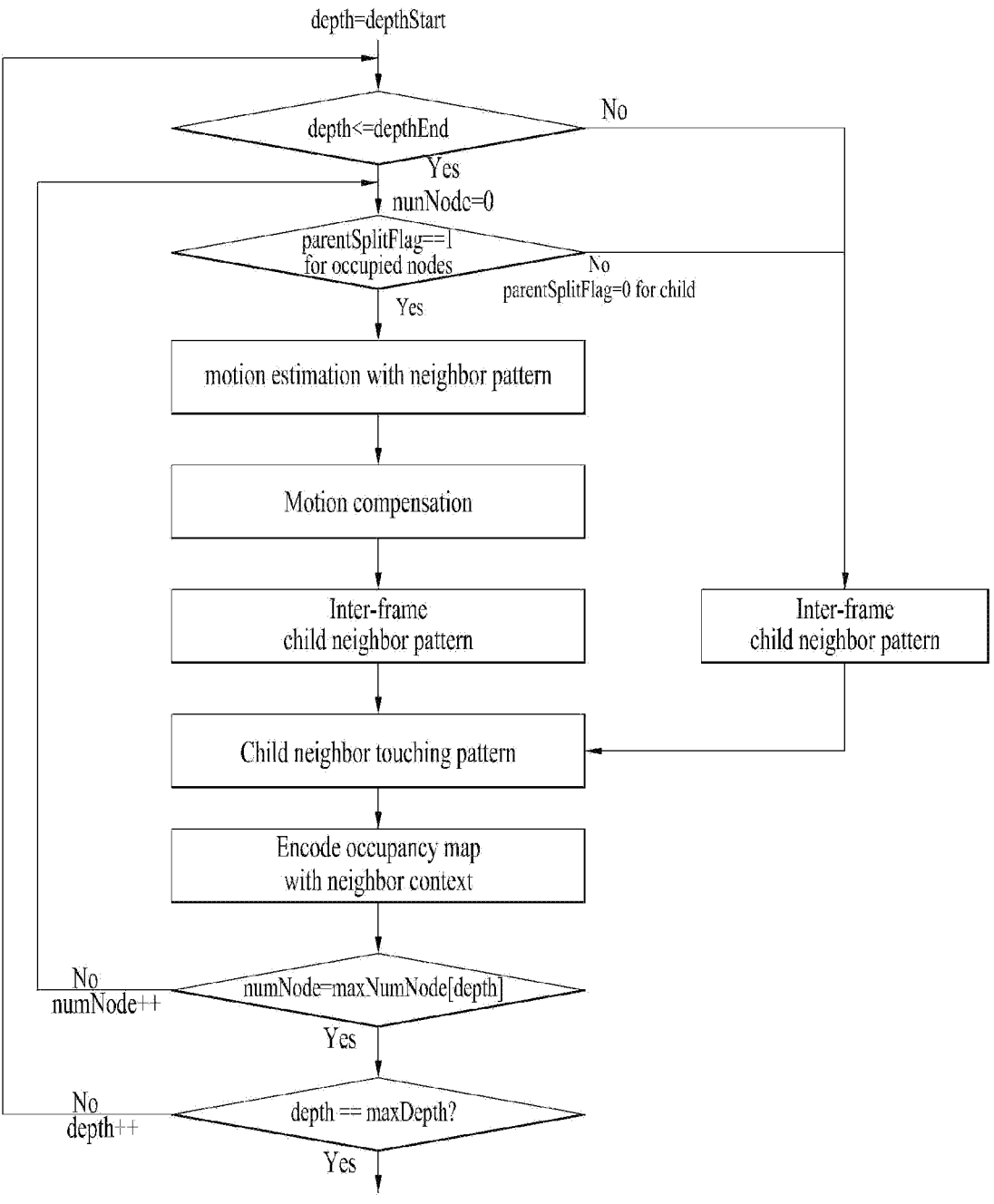
FIG. 36 illustrates a point cloud data transmission method according to embodiments.

FIGS. 15 and 16 illustrate an example of estimating motion to estimate similar information in a reference frame by the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoders of FIGS. 15 and 34, the encoding of FIG. 36, the transmission method of FIG. 38, the reception device 10004 of FIG. 1, the receiver 10005 of FIG. 1, the point cloud video decoder 10006 of FIG. 1, the transmission 20002/decoding 20003/rendering 20004 of FIG. 2, the decoders of FIGS. 10 and 11, the reception device of FIG. 13, the device of FIG. 14, the decoders of FIGS. 15 and 35, the decoding of FIG. 37, the reception method of FIG. 39, and the like.

1) Neighbor Occupancy-Based Motion Estimation According to Embodiments

Motion estimation according to embodiments may be performed on a per prediction unit (PU) basis. Here, the PU may be defined as a set of adjacent nodes at a specific depth of an octree of the current frame. In particular, it may be defined as a set of nodes having the same parent.

For any PU 1500 defined for the current frame that is currently the target of encoding and/or decoding, motion 1502 may be estimated to estimate similar information 1501 in the reference frame, as shown in FIG. 15. The reference frame refers to a frame referenced in encoding/decoding a current frame, and may represent a frame that is encoded and/or decoded before the current frame. By referencing the frame processed before the current frame, the encoding/decoding efficiency of the current frame may be increased.

In this case, for efficiency of the motion estimation, a motion search window may be defined with respect to a reference frame and similarity to the information included in the PU 1500 may be estimated. In this regard, as a method for increasing the accuracy of motion estimation, information about neighbor nodes 1503 of the PU may be used. Six neighbor nodes 1503 positioned on the top, bottom, left, right, front, and back sides of the target node may be considered at the same time. According to the application method, another definition (e.g., nodes contacting a point, a line, and a surface) may be used for the neighbor nodes. This is based on an assumption that a similar motion may occur for a specific node as well as a neighbor node for a region having a high continuity between frames. When a set of points belonging to a PU belonging to a current frame is defined as block B 1500, and a set of points belonging to a prediction candidate defined within the search window W in a reference frame (inter-frame) is referred to as a predictor candidate P 1501, a difference D(B, P) between B and P may be defined as a function of a difference for each point as shown in FIG. 16. Here, the sets of neighbor nodes 1501 and 1503 of B and P may be defined as Bn and Pn, and the relative position of each node may be represented as B(−1, 0, 0), B(1, 0, 0), B(0, −1, 0), B(0, 1, 0), B(0, 0, −1), and B(0, 0, 1) or P(−1, 0, 0), P(1, 0, 0), P(0, −1, 0), P(0, 1, 0), P(0, 0, −1), and P(0, 0, 1) with respect to PU and/or P. When points belonging to B and P are b and p, the positions thereof may be defined as b(x, y, z) and p(x, y, z). When points belonging to Bn and Pn are defined as bn and pn, the difference therebetween may be presented. In FIG. 16, w may be used as a weight for determining the importance of a predictor and a neighbor. Different weights may be applied according to a neighbor position as necessary.

When the difference between the PU and the prediction candidate is defined as described above, the motion estimation in the reference frame for the PU may define the P 1501 having the smallest D(B, P) among all prediction candidates P that may be defined in the search window as a predicted value, and the motion vector V 1502 between the two blocks may be defined as the position difference between the two blocks, as shown in FIG. 16.

Thereby, a minimum error may be generated and a best motion vector may be found in terms of transmission efficiency. A cost function that controls the error D(B, P(W,V)) caused by the motion vector and the bit usage caused by use of the motion vector with a weight function λ may be generated as shown in FIG. 16. When the cost function of FIG. 16 is used, an optimal motion vector that uses fewer bits while reducing error may be found according to the weight function. For example, when the weight function is 0, a motion vector that minimizes error will be used; conversely, when the weight function is infinite, the motion vector will converge to motion vector=0 to minimize the bits used.

FIG. 17 illustrates motion vector transmission for an octree depth according to embodiments.

According to embodiments, as shown in FIGS. 15 and 16, a similarity may be estimated for a current PU, and a motion vector may be found at a specific octree depth. Further, a motion vector may be found for an optimal octree in a specific octree depth range. In this case, it may be notified whether each octree node is occupied or not. When the motion vector is not found, it may be notified that the octree should be split. The occupancy bit information about a child node for the current node at the current octree depth may be indicated by a population flag. Whether to transmit a motion vector at a current octree depth at a lower depth may be indicated through a split flag. The population flag and the split flag may be transmitted in a bitstream.

When the split flag is equal to 0, the motion vector may be transmitted based on the node of the current depth.

When the split flag is equal to 1, it may indicate that splitting from the current depth to the next depth is performed. The population flag may indicate bit occupancy for a split region. When the flag is equal to 1, there is an occupancy bit. When the flag is equal to 0, there is no occupancy bit.

LPU is the largest prediction unit and may include a plurality of PUs. The LPU may be split into PUs. There may be an LPU with an occupancy bit and an LPU without the occupancy bit. The LPU with the occupancy bit may be split into PUs. Based on the octree depth, the node may be divided in detail as the depth increases.

After applying the first split at a specific depth, the number of cases of performing the second split may be varied on a 2D basis as shown in FIG. 17. In this regard, the presence of an occupancy bit for the split node (region) may be indicated by a pop flag.

For example, when the split flag is equal to 0, the node of the current depth is not split. When the split flag is 1, the node of the current depth is split into 4 nodes on the 2D basis. When there is no further splitting of the split nodes, 0 bits are assigned to the flag. That is, the split flag becomes 1 0000. When the split nodes are a first quadrant, a second quadrant, a third quadrant, and a fourth quadrant on the 2D basis, the pop flag is 1000 when the first quadrant has an occupancy bit and the other quadrants do not have the occupancy bit.

FIG. 18 illustrates a cost function according to embodiments.

As shown in FIG. 18, in order to determine whether splitting is performed at each octree depth, a cost function may be defined as an accumulated value for a sub-PU cost. A cost may be determined in the direction in which the lowest cost is obtained.

Based on the cost for motion vector 1 with an occupancy bit and the cost for motion vector 2, the cost function may be calculated.

When the occupancy is equal to 1001 at a specific depth, a cost for motion vector 1 and motion vector 2 of the occupancy node may be calculated to determine whether to perform splitting.

Figure 19:
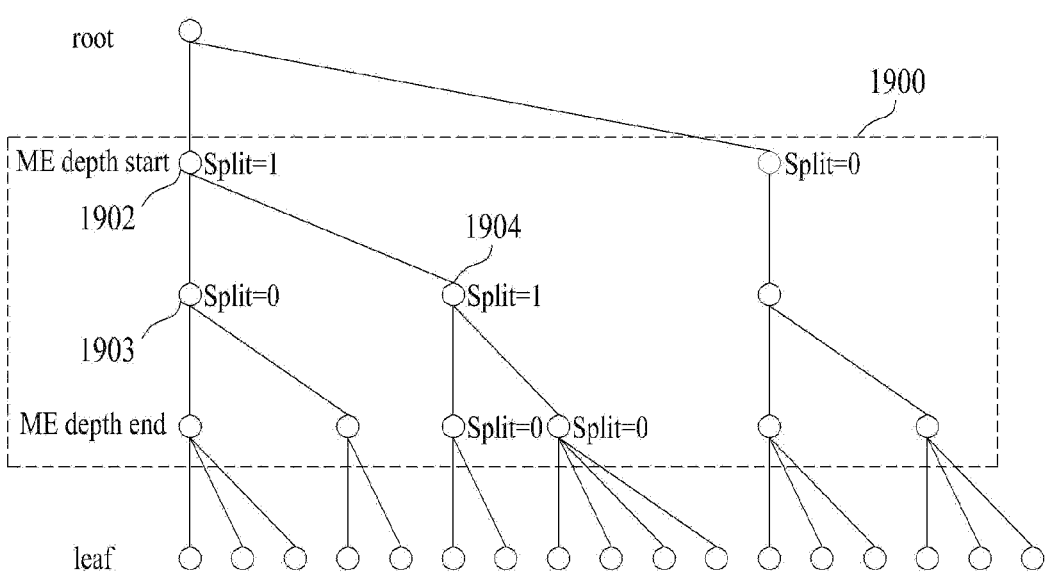
FIG. 19 illustrates an example of splitting in an octree depth according to embodiments.

FIG. 19 illustrates an example of splitting in an octree depth according to embodiments.

FIG. 19 shows a result from a process of finding a motion vector (MV) for point cloud data having an octree structure, and a depth range for performing motion estimation in an octree structure from a root to a leaf is indicated as 1900. When a lower cost is required when the MV is transmitted without a specific node being split than when the MV is transmitted with the node being split, split=0 may be specified and the MV for the node may be transmitted. On the contrary, when a lower cost is required when splitting is performed than when the MV is transmitted, the MV may be transmitted from the sub-node.

Area 1900 may be indicated by an ME (motion estimation) depth start and an ME depth end.

In order to compress and/or reconstruct node 1902, a cost for generating the MV in node 1902 may be calculated, node 1902 may be split, and a cost for generating the MV in node 1903 and node 1904 may be generated. Then, the two costs may be compared. When the cost of the lower depth split is more efficient, the split may be performed, and 1 may be assigned to the split flag as a value.

Figure 20:
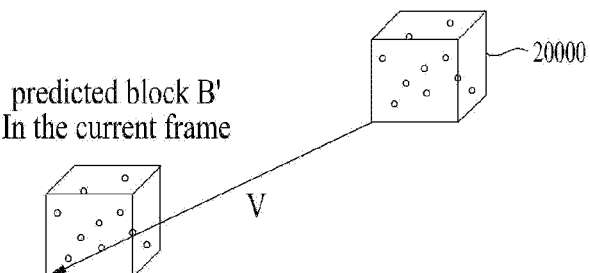
FIG. 20 illustrates an inter-prediction according to embodiments.

FIG. 20 illustrates an inter-prediction according to embodiments.

As shown in FIG. 15, an inter-prediction-based attribute compression/reconstruction method according to embodiments may specify a prediction block predictor P through information about motion vector V for a reference frame. When the position of the PU block in which the prediction is performed on the current frame is B(x, y, z), and motion vector V is V(x, y, z), the position P(x, y, z) (geometry data) of predictor P may be defined as shown in FIG. 20.

In this case, the position of the block may be defined as a minimum value on each axis of the bounding box for the point included in the block. Based on P defined in the reference frame, prediction target B for the current frame may be predicted. When the predicted block for the PU in the current frame is B', the occupancy of points belonging to B' may conform to the occupancy of P, and the position and attributes of points b' belonging to B' may be defined for the position and attributes of point P belonging to P, as shown in FIG. 20.

FIG. 21 illustrates motion estimation considering neighbor occupancy according to embodiments.

When predicting the inter-frame-based current point cloud data (position and attributes) as shown in FIG. 20, peripheral neighbors may be additionally considered.

2) Neighbor Occupancy Pattern

When information in a reference frame that is found based on motion estimation according to embodiments is defined as a predictor, the child occupancy of the predictor may be used as additional information for increasing the compression (reconstruction) efficiency of the child occupancy information about the PU. Entropy coding may be used in compressing the point cloud data, and may be used as a context for increasing efficiency of compression. The compression efficiency may be increased by referencing the distribution characteristics of similar points in the previous frame by using the reference frame based prediction in compressing the PU child occupancy. Similarly, when not only the predictor of the reference frame but also neighbor occupancy is taken into consideration, the accuracy of prediction and the compression efficiency may be increased by referencing the neighbor distribution. To take neighbor occupancy into consideration, a method of considering a neighbor occupancy pattern of a predictor, and a method of comparing the characteristics of neighbor occupancy distributions of the predictor and a PU are described.

Within the reference frame, the neighbor occupancy pattern may be used for compression (reconstruction) for a predictor selected as a block similar to the PU to be predicted. When the neighbor nodes of the predictor 20000 (the cubes whose faces touch the predictor) are defined as previously defined in motion estimation, 64 (=2^6) patterns may be defined depending on the occupancy of the 6 neighbor nodes. Each neighbor node has an assigned number, and the occupancy pattern index may be defined by summing the numbers corresponding to the occupied neighbor nodes. For example, the index for the occupied neighbor nodes on the top, bottom, left, and right may be 1+2+4+8=15. A neighbor node is considered as a node that has the same size as the predictor and contacts the predictor face to face. However, a neighbor node that has a different size or is at another position may be considered.

Figure 22:
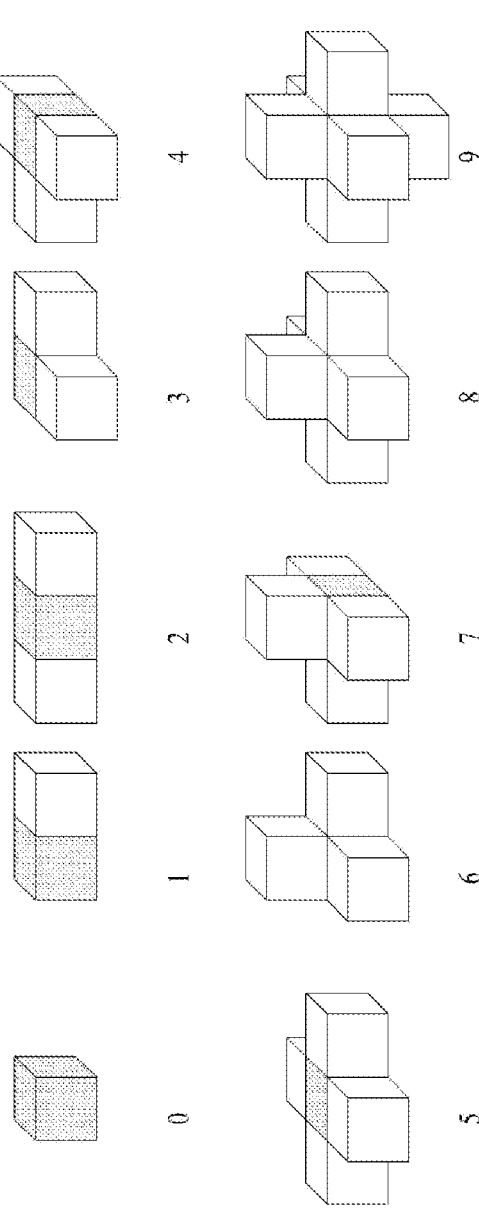
FIG. 22 illustrates an occupancy pattern according to embodiments.

FIG. 22 illustrates an occupancy pattern according to embodiments.

The number of occupied patterns that may be presented in FIG. 21 may be reduced as shown in FIG. 22.

By rotating the predictor, the number of patterns may be reduced. For example, when only one node is occupied, and the predictor is rotated 90°, 180°, and 270° in the x-y plane extending up, left, and down and rotated 90° and 270° in the x-z plane extending back and forward, the pattern may be considered as the same as that given when the right node is occupied. In this way, the number of patterns may be reduced through rotation, mirroring, or the like. An example in which 64 patterns are reduced to 10 patterns in consideration of redundant patterns is described below.

FIG. 23 illustrates a neighbor occupancy comparison score according to embodiments.

3) Neighbor Occupancy Comparison Score According to Embodiments

As a context based on the neighbor occupancy pattern, the similarity between the predictor and the corresponding neighbor of the PU may be compared. FIG. 23 defines 6 neighbors for each of the PU and predictor and shows the corresponding neighbor nodes for each of the up, down, left, right, front, and back positions. In this case, as the rate of matches of occupancy information about the corresponding nodes increases, it may be determined that the prediction accuracy of the predictor is high. On the contrary, if the occupancy information about the neighbor nodes is all mismatched, it may be determined that the prediction accuracy of the predictor is low.

FIG. 24 illustrates a neighbor occupancy comparison process according to embodiments.

Two methods may be used to compare neighbor occupancies of the predictor and the PU as shown in FIG. 24 to compare neighbor occupancy comparison scores as shown in FIG. 23. First, whether the n-th neighbor of the PU or the predictor is occupied may be indicated by a PU neighbor occupancy flag (n) or a predictor neighbor occupancy flag (n). The flag equal to 1 may indicate that the n-th neighbor is occupied. The flag equal to 0 may indicate that the n-th neighbor is non-occupied. Based on the indication, whether the occupancies of the n-th neighbors of the PU and the predictor match may be defined. That is, when the PU neighbor occupancy and the predictor neighbor occupancy match with each other for the n-th neighbor position (namely, both neighbors are occupied or unoccupied), the n-th neighbor occupancy comparison flag is defined as 1. When the PU neighbor occupancy and the predictor neighbor occupancy do not match for the n-th neighbor position (namely, one neighbor is occupied and the other is unoccupied), the n-th neighbor occupancy comparison flag may be defined as 0.

The neighbor occupancy score of the predictor may be obtained based on the comparison of the neighbors of the PU and the predictor. In the following embodiment, a method of obtaining a neighbor occupancy score is described, which may include 1) a method for indicating a pattern according to each position based on the neighbor occupancy comparison flag, 2) a method for obtaining the number of matching neighbors, 3) the number of occupied neighbors matching between the PU and the predictor, and 4) the number of unoccupied neighbors matching between the PU and the predictor.

A context table may be selected based on the neighbor occupancy score. For example, in the case of neighbor occupancy score 1, a different context table may be used for each score, or rotation, context tables may be distinguished from each other by a smaller number of scorers (e.g., 10 neighbor patterns) by removing occupancy scores duplicated by the rotation or tile. In another method, neighbor occupancy score 2 may be divided into two or more sections according to a threshold to distinguish and use context tables. In this case, if the score is greater than or equal to the threshold, there may be a sufficient number of matches. In this case, the probability of high similarity of the prediction may be high. If the score is less than the threshold, there may be many mismatches, and thus the probability of low similarity of the prediction may be high. Each context table may update the probabilities of matches and mismatches distinguishably. As another example, neighbor occupancy scores 3 and 4 are obtained by examining cases where the predicted neighbor nodes are occupied or unoccupied depending on whether the neighbor nodes of the node to be compressed are occupied or unoccupied, and different context tables may be used by comparing the matching rates of the predicted neighbor nodes in the case of occupancy/inoccupancy of the neighbor node comparing the two values.

FIG. 25 illustrates a neighbor child occupancy pattern according to embodiments.

4) Neighbor Child Occupancy Pattern According to Embodiments

The method/device according to embodiments including the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoders of FIGS. 15 and 34, the encoding of FIG. 36, the transmission method of FIG. 38, the reception device 10004 of FIG. 1, the receiver 10005 of FIG. 1, the point cloud video decoder 10006 of FIG. 1, the transmission 20002/decoding 20003/rendering 20004 of FIG. 2, the decoders of FIGS. 10 and 11, the reception device of FIG. 13, the device of FIG. 14, the decoders of FIGS. 15 and 35, the decoding of FIG. 37, and the reception method of FIG. 39 may obtain an occupancy probability of the current node based on occupancy information about the neighbor node of the current node. The occupancy information about a neighbor child may be utilized. FIG. 25 illustrates the possibility of neighbor child occupancy 2502 for a child node 2501 of a compression target node (i.e., the parent node 2500 of the current frame). In this case, the relationship between the compressed target child node (cube) 2501 and the neighbor child node (hatched cube) 2502 may be considered based on the number of child nodes making a surface (or line) contact. Since the occupancy of the child node in the prediction target node 2501 is not known, only the number of child nodes 2502 that are in surface (or line) contact (or touch) with the current child (hatched cube) 2501 among the neighbors (cube) 2503 of the parent may be considered. In this case, the maximum neighbor touching (NT) number may be 3. For example, as a method for reducing the number of contexts, three different cases may be considered as one case depending on the direction in a case where NT is 2 and a case where NT is 1 in consideration of rotation. However, a case where there is no burden on a context buffer may be considered as a separate case from the case where a difference according to rotation is considered. The neighbor touching according to the embodiments may refer to a surface contact or line contact between nodes (boxes). The neighbor touching according to the embodiments may be referred to as a neighbor or a neighbor candidate. When NT=3, NT=1, or NT=0, the touching pattern may be searched and generated as shown in FIG. 25. Based on the touching pattern, the current node 2501 may be efficiently compressed and reconstructed based on the neighbor nodes 2502.

FIG. 25 may correspond to predictor_neighbor_enabled_flag=0 (which indicates using only a predictor).

Figure 26:
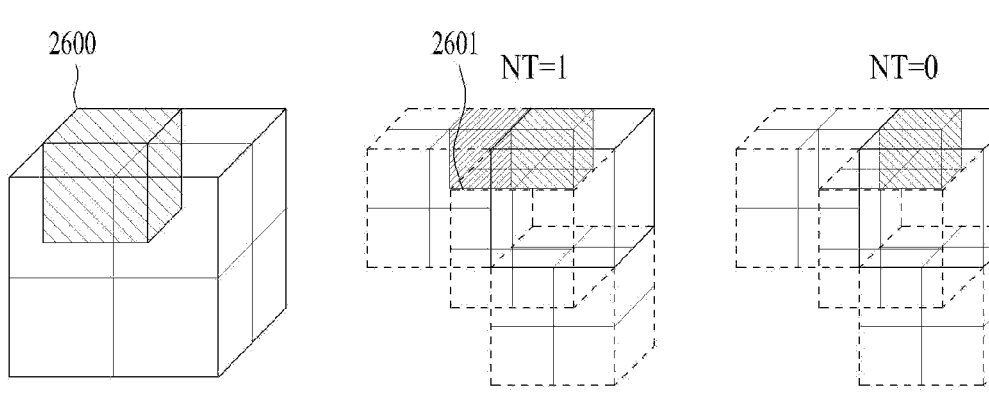
FIG. 26 illustrates a neighbor child occupancy pattern according to embodiments.

FIG. 26 illustrates a neighbor child occupancy pattern according to embodiments.

In comparison with FIG. 25, FIG. 26 illustrates a possible embodiment of NT when the current child position is different. In this case, when the position of the current node is the top-left-back 2600 in the bounding box, a constraint may occur in terms of a parent neighbor. This is because the parent neighbors are present only on the left, front, and bottom in the coding order. In other words, for a child in the top-left-back position, the parent neighbor is present only on the left (the child in the front position is not considered because it is a child belonging to the current parent, and the child in the back position does not have a parent neighbor because the parent neighbor has not been coded), and therefore the neighbor child touching is determined depending on whether the left neighbor child 2601 is present. In other words, the maximum value of NT is 1, and there are only two cases of 0 or 1.

FIG. 27 illustrates a neighbor child occupancy pattern according to embodiments.

The consideration of neighbor child occupancy in FIGS. 25-26 may be extended as shown in FIG. 27.

An extension method according to embodiments may include 3 neighbor children based on a predictor and a current neighbor.

The child occupancy information about the previous frame may be used regarding the position issue of the parent neighbor. FIG. 27 illustrates the number of neighbor child touches for eight child node positions. In the drawing, the dashed cube 2700 represents the neighbor node for the current node, and the hatched cube 2701 represents the child of the neighbor node. When a node corresponding to the current node in a previous frame is a predicted node, the neighbor of the predicted node may be represented by a line 2702. In this case, for uncoded neighbors at the right, back, and top positions, neighbors may be referenced from the previous frame. In other words, based on the correlation between the current parent node and the predicted parent node, there is a similarity between the current neighbor and the neighbor of the predicted node, and there is a correlation even in child occupancy. In other words, a reference node with high similarity between frames may be configured for encoding and decoding.

Based on these correlations, neighbors may be inferred for the parts of the current parent node that have no neighbors, i.e., the top, right, and back positions, and three-child neighbor touching may be considered for the eight child node positions (bottom-left-front, bottom-left-back, bottom-right-front, bottom-right-back, top-left-front, top-left-back, top-right-front, top-right-back), and the same NT may be considered for all positions.

Depending on the application, different weights may be applied to the neighbor information about the current frame and the neighbor information about the predicted frame. For example, when the validity of the neighbor information about the current frame is greater than the neighbor information about the predicted frame, a greater weight may be given to the neighbor information about the current frame in obtaining the NT. A prediction of the current node may be performed based on the inter-frame 2702 and intra-frame 2700.

FIG. 27 may correspond to a case where inter_predicted_neighbor_child_occupancy_type=0 (a predictor-based 3 neighbor child method that uses predicted neighbors for positions where the current neighbor node is not present).

Figure 28:
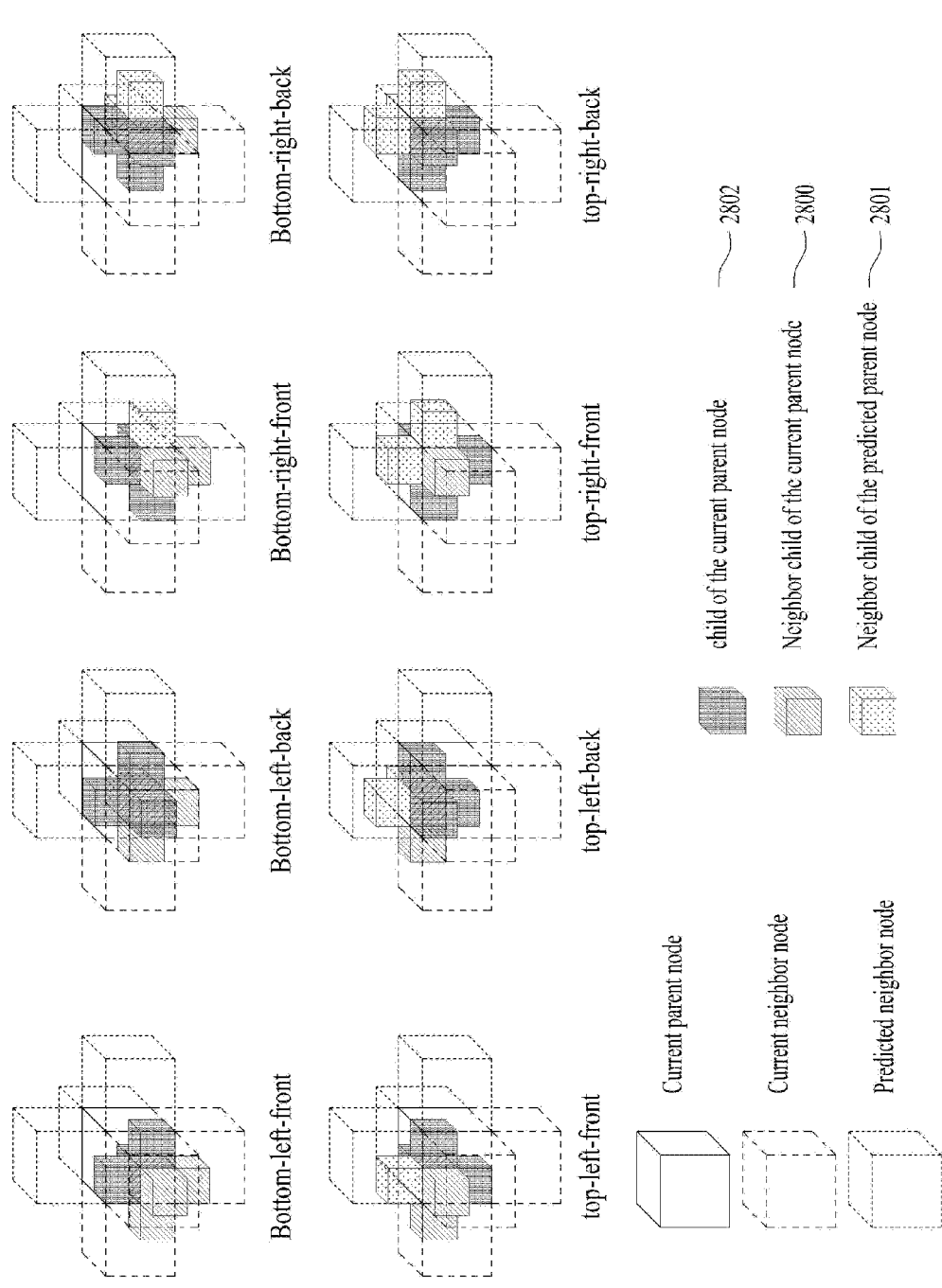
FIG. 28 illustrates a neighbor child occupancy pattern according to embodiments.

FIG. 28 illustrates a neighbor child occupancy pattern according to embodiments.

The neighbor child occupancy considerations of FIGS. 25 to 27 may be extended as shown in FIG. 28.

The extended method according to embodiments may include 6 neighbor children based on a predictor, a current neighbor, and a sibling.

In addition to considering the child of the neighbor of the predicted parent, siblings belonging to the current node may be considered. FIG. 28 illustrates the case of considering 6-neighbor touching based on a child 2800 of the current neighbor, a neighbor child 2801 of the predicted parent, and a sibling 2802 belonging to the current node for 8 child node positions.

The sibling node 2802 is a node belonging to the previous frame. Assuming that the child node of the current frame is not present because it has not yet been coded, the information about the child node belonging to the parent node of the predictor corresponding to the current parent node in the previous frame may be considered.

FIG. 28 may correspond to a case where inter_predicted_neighbor_child_occupancy_type=1 (6 neighbor child method based on the predictor, current neighbor, and sibling, which additionally uses the predicted neighbor for positions where the current neighbor node is not present, and considers the occupancy of the sibling node together).

FIG. 29 illustrates a neighbor child occupancy pattern according to embodiments.

The neighbor child occupancy considerations of FIGS. 25 to 29 may be extended as shown in FIG. 28.

The extended method according to embodiments may include 6 neighbor children based on a predictor and a sibling.

A case may be considered where all neighbors of the predicted parent are used. In this case, faster compression may be obtained due to the consideration of neighbors regardless of whether the neighbor node is compressed or not.

A method of updating the neighbor information about the current frame by directly referencing the neighbor information about the previous frame has been described. However, depending on the application, the child occupancy of the prepredic parent node may be determined based on the neighbor information about the previous frame, and this information may be further used to predict the child occupancy of the current parent.

While the above only considers children with face to face touching, the above method may be extended to reference the occupancy of children with corner or vertex touching.

FIG. 29 may correspond to the case where inter_predicted_neighbor_child_occupancy_type=2 (a predictor- and sibling-based 6 neighbor child method that uses only predicted neighbors instead of current neighbors, and considers siblings together).

FIG. 30 illustrates a bitstream structure according to embodiments.

The transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoders of FIGS. 15 and 34, the encoding of FIG. 36, and the transmission method of FIG. 38 may generate a bitstream as shown in FIG. 30, and the reception device 10004 of FIG. 1, the receiver 10005 of FIG. 1, the point cloud video decoder 10006 of FIG. 1, the transmission 20002/decoding 20003/rendering 20004 of FIG. 2, the decoders of FIGS. 10 and 11, the reception device of FIG. 13, the device of FIG. 14, the decoders of FIGS. 15 and 35, the decoding of FIG. 37, the reception method of FIG. 39, and the like may parse the bitstream shown in FIG. 30.

Regarding attribute coding and/or geometry coding according to embodiments, information related to inter prediction may be defined in a parameter set, a data unit header (corresponding to a slice header), or a data unit (corresponding to a slice), depending on the unit of application, and may be defined in a corresponding or separate position, depending on the application or system to provide different scopes and methods of application, etc. While the embodiments describe defining information in a data unit, the information may be defined in a parameter set or a data unit header as described above or may be associated with an attribute coding method. For application to attribute coding, the information may be defined in an attribute parameter set and an attribute slice header, and may be defined in a sequence parameter set, a tile parameter set, and the like. In addition, if the syntax element to be described later is applicable not only to the current point cloud data stream but also to multiple point cloud data streams, it may be delivered through a superordinate parameter set, etc.

Signaling information according to embodiments may be generated in a compression (encoding) process of a (scalable) point cloud compression transmission device/method and used in a decoding process of a (scalable) point cloud compression reception device/method.

Parameters (which may be referred to as metadata, signaling information, etc.) according to embodiments may be generated in a process of a transmitter according to embodiments described below, and delivered to a receiver according to embodiments for use in a reconstruction process. For example, the parameters according to the embodiments may be generated in a metadata processor (or metadata generator) of the transmission device according to the embodiments described below and acquired by a metadata parser of the reception device according to the embodiments described below.

Compression through a reference relationship between slices according to embodiments may be applied not only to the start node of a slice, but also to any node to reference a node in another slice. It may also be extended to a reference relationship between trees.

Each abbreviation has the following meaning. SPS: Sequence Parameter Set; GPS: Geometry Parameter Set; APS: Attribute Parameter Set; TPS: Tile Parameter Set; Geom (geometry): geometry bitstream=geometry slice header+geometry slice data; Attr (attribute): Attribute bitstream=attribute slice header+attribute slice data.

A point cloud data encoder, a transmission device, and the like according to embodiments may generate signaling information about operations according to embodiments, and may generate and transmit a bitstream containing the point cloud data as described above.

A point cloud data decoder, a reception device, and the like according to embodiments may receive a bitstream and reconstruct point cloud data based on parameter(s) included in the bitstream.

The bitstream may contain a sequence parameter set (SPS), a geometry parameter set (GPS), an attribute parameter set (APS), a geometry slice header, and an attribute slice header. In this regard, depending on the application or system, the range and method to be applied may be defined in a corresponding or separate position and used differently. That is, a signal may have different meanings depending on the position where the signal is transmitted. If the signal is defined in the SPS, it may be equally applied to the entire sequence. If the signal is defined in the GPS, this may indicate that the signal is used for position reconstruction. If the signal is defined in the APS, this may indicate that the signal is applied to attribute reconstruction. If the signal is defined in the TPS, this may indicate that the signal is applied only to points within a tile. If the signal is delivered in a slice, this may indicate that the signal is applied only to the slice. In addition, the range and method to be applied may be defined in a corresponding position or a separate position depending on the application or system so as to be used differently. In addition, when the syntax elements defined below are applicable to multiple point cloud data streams as well as the current point cloud data stream, they may be carried in a superordinate parameter set.

The tile parameter set may carry information about the position, width, size, depth, etc. of the bounding box for multiple tiles.

For a plurality of encoded slices, a slice may contain one geometry data and a plurality of attribute data, depending on the configuration of the point cloud data. A slice may carry parameter set identification information, tile identification information, slice identification information, bounding box position information, point number information, attribute related information, and the like through a slice header.

A slice may be referred to as a data unit or the like.

FIG. 31 illustrates a geometry parameter set according to embodiments.

The parameter set of FIG. 31 may be contained in the bitstream of FIG. 30.

predictor_neighbor_enabled_flag: When equal to 1, the flag may indicate that the relationship between the predictor and its neighbor nodes in the reference frame is used in considering inter-frame relationships. When equal to 0, the flag may indicate that only the predictor is used.

predictor_neighbor_type: indicates considering the relationship between the predictor and the child node. When equal to 0, it may indicate a predictor-based 3 neighbor child method (FIG. 27) that uses a predicted neighbor for positions where the current neighbor node is not present. When equal to 1, it may indicate a 6-neighbor child method based on a predictor, a current neighbor, and a sibling (FIG. 28), which additionally uses a predicted neighbor for positions where the current neighbor node is not present and considers the occupancy of the sibling node together. When equal to 2, it may indicate that a 6-neighbor child method based on a predictor and a sibling (FIG. 29), which uses only the predicted neighbor instead of the current neighbor, and considers siblings together, is used.

inter_predicted_neighbor_child_occupancy_enabled_flag: When equal to 1, it may indicate that the neighbor child of the predicted node for the reference frame is taken into consideration in considering the relationship between frames. When equal to 0, it indicates that only the relationship of the neighbor child in the current frame is used.

inter_predicted_neighbor_child_occupancy_type: may indicate a method to consider the relationship between the predictor and neighbor nodes thereof. When equal to 0, it may be defined as considering the predictor neighbor pattern. When equal to 1, it may be defined as using a comparison pattern of the predictor neighbor pattern and the current node neighbor pattern. When equal to 2, it may be defined as using the number of matching nodes for the predictor neighbor pattern and the PU neighbor pattern. When equal to 3, it may be defined as the number of nodes whose positions match among the occupied neighbors of the predictor and the PU. When equal to 4, it may be defined as the number of nodes whose positions match among the unoccupied neighbors of the predictor and the PU.

The method/device according to embodiments may use the occupancy pattern itself as additional information for selecting a context table, or may select a context table based on the degree of match based on a comparison with the neighbor pattern of the node to be compressed. Entropy coding may be performed based on the selected context table. That is, a context table may be selected based on inter_predicted_neighbor_child_occupancy_type. inter_predicted_neighbor_child_occupancy_type may indicate a method to consider the relationship between the predictor and the neighbor nodes thereof. When equal to 0, it may be defined as considering the predictor neighbor pattern. When equal to 1, it may be defined as using the comparison pattern of the predictor neighbor pattern and the current node neighbor pattern. When equal to 2, it may be defined as using the number of matching nodes for the predictor neighbor pattern and the PU neighbor pattern. When equal to 3, it may be defined as using the number of nodes whose positions match among the occupied neighbors of the predictor and the PU. When equal to 4, it may be defined as the number of nodes whose positions match among the unoccupied neighbors of the predictor and the PU. The calculation of the score according to each method is performed as described with reference to FIG. 24. The score for each relationship may be calculated to select the most efficient method to perform encoding/decoding.

The geometry parameter set may further contain the following information.

gps_geom_parameter_set_id identifies the GPS for reference by other DUs.

gps_seq_parameter_set_id indicates the value of the active sps_seq_parameter_set_id.

slice_geom_origin_scale_present indicates whether slice_geom_origin_log 2_scale is present in the GDU header. slice_geom_origin_scale_present equal to 0 indicates that the slice origin scale is equal to gps_slice_geom_origin_log 2_scale.

gps_geom_origin_log 2_scale changes the packet to find the origin at slice_origin_xyz when slice_geom_origin_scale_present is equal to 0.

duplicate_points_enabled equal to 0 indicates that for all slices that reference the current GPS, every output point has a unique position within the slice. duplicate_points_enabled equal to 1 indicates that for all slices that reference the current GPS, two or more output points can have the same position within the slice. duplicate_points_enabled equal to 0 does not prohibit coding the same point position multiple times within a single slice.

geom_tree_type equal to 0 indicates that slice point positions are coded using an occupancy tree. geom_tree_type equal to 1 indicates that the slice point positions are coded using a predictive tree.

occtree_point_cnt_list_present indicates whether a point count list for each occupancy tree level is present in the GDU footer. When not present, occtree_point_cnt_list_present is inferred to be 0.

occtree_direct_coding_mode greater than 0 indicates that the point position can be coded by a suitable direct node in the occupancy tree. occtree_direct_coding_mode equal to 0 indicates that the direct node should not be present in the occupancy tree.

occtree_direct_joint_coding_enabled equal to 1 indicates that when two points are coded by a direct node, their positions should be coded jointly, partially assuming a certain ordering of the points.

occtree_coded_axis_list_present equal to 1 indicates that the GDU header contains the syntax element occtree_coded_axis, which is used to derive the node sizes at each occupancy tree level. occtree_coded_axis_list_present equal to 0 indicates that the syntax element occtree_coded_axis is not present in the GDU syntax and that the occupancy tree represents a cubic volume.

occtree_neigh_window_log 2_minus1 plus 1 specifies the number of occupancy tree nodes that form a window that includes the outside of the current node, and the node is unavailable in the process related to the node. occtree_neigh_window_log 2_minus1 equal to 0 indicates that only sibling nodes are considered available at the current node.

occtree_adjacent_child_enabled, when equal to 1, indicates whether the adjacent child of an adjacent occupancy tree node is enabled under a bit-occupied situation. When not present, occtree_adjacent_child_enabled is inferred to be 0.

occtree_intra_pred_max_nodesize_log 2 indicates an appropriate occupancy tree node size for occupancy intra prediction. When not present, occtree_intra_pred_max_nodesize_log 2 is inferred to be 0.

occtree_bitwise_coding equal to 1 indicates that occupancy tree node occupancy is encoded using the syntax element occupancy bit using bitwise contextualization. occtree_bitwise_coding equal to 0 indicates that the occupancy tree node occupancy is encoded using the pre-encoded syntax element occupancy byte.

occtree_planar_enabled equal to 1 indicates that the planar coding mode is enabled. occtree_planar_enabled equal to 0 indicates that the planar coding mode is not enabled. When not present, occtree_planar_enabled is inferred to be 0.

occtree_planar_threshold[i] indicates the value of an enabling threshold for the planar coding mode along the i-th direction where the planar coding mode is most likely to be efficient.

occtree_direct_node_rate_minus1 indicates that out of all 32 qualified direct nodes, only occtree_direct_node_rate_minus1+1 can be coded.

geom_angular_enabled indicates whether to code geometry based on the priority of a beam set positioned at an angular origin and rotating about a V axis.

slice_angular_origin_present indicates whether the slice-related angular origin is present in the GDU header. slice_angular_origin_present equal to 0 specifies that the angular origin is gps_angular_origin_xyz. When not present, slice_angular_origin_present is inferred to be 0.

gps_angular_origin_bits_minus1 plus 1 indicates the length, in bits, of each syntax element gps_angular_origin_xyz[k].

gps_angular_origin_xyz[k] represents the k-th (x, y, z) position component of the beam origin. When not present, gps_angular_origin_xyz[k] is inferred to be 0.

ptree_angular_azimuth_pi_bits_minus11 and ptree_angular_radius_scale_log 2 indicate factors used to scale the coded position using each coordinate system during the transformation to Cartesian coordinates.

ptree_angular_azimuth_step_minus1 plus 1 indicates the change in units of the azimuth. The differential prediction residuals used for coding the angular predictive tree may be partially expressed as a multiple of ptree_angular_azimuth_step_minus1 plus 1. The value of ptree_angular_azimuth_step_minus1 shall be less than (1<<(ptree_angular_azimuth_pi_bits_minus11+12))

num beams_minus1 plus 1 indicates the number of beams used for the angular coding mode.

beam_elevation_init and beam_elevation_diff[i] together indicate the beam elevation as a slope above the plane defined by the first and second coded axes. The beam-specific elevation slope specified by the BeamElev array is a binary fixed-point value with 18 decimal bits.

beam_voffset_init and beam_voffset_diff[i] together indicate the modification along the V axis of the i-th beam position with respect to GeomAngularOrigin[2].

beam_samples_per_turn_init_minus1 and beam_samples_per_turn_diff[i] indicate the number of samples generated by the i-th beam of the rotation detection system located at the origin used for processing of the angular coding mode.

occtree_planar_buffer_disabled equal to 1 indicates that the planar mode flag and the use of a buffer to track the nearest node in the process of coding planar positions in the planar mode are disabled. occtree_planar_buffer_disabled equal to 0 indicates that using the buffer to track the nearest node is enabled. When not present, occtree_planar_buffer_disabled is inferred to be !occtree_planar_enabled.

geom_scaling_enabled equal to 1 causes the scaling process for geometry positions to be invoked during the geometry decoding process. geom_scaling_enabled equal to 0 specifies that scaling is not required for geometry positions. When not present, geom_scaling_enabled is inferred to be 0.

geom_initial_qp indicates the initial geometry position QP. When not present, geom_initial_qp is inferred to be 0.

geom_qp_multiplier_log 2 indicates the scale factor to apply to the geometry QP value before deriving the geometry scaling step size and movement. The value of geom_qp_ multiplier_log 2 is in the range of 0 to 3. For x=0 . . . 3, geom_qp_multiplier_log 2 equal to x indicates that (8>>x) may be specified whenever the QP value is twice the geometry scaling step size.

ptree_qp_period_log 2 indicates the base frequency for signaling the predictive tree node QP offset.

occtree_direct_node_qp_offset indicates the offset relative to sliceQp for use at a scaling point position coded by the direct coding mode. When not present, the value of occtree_direct_node_qp_offset is inferred to be equal to 0.

gps_extension_present equal to 0 indicates that the syntax element gps_extension_data is not present in the GPS syntax structure. gps_extension_present shall be equal to 0 in bitstreams conforming to this version of this document. The value 1 for gps_extension_present is reserved for future use by ISO/IEC. A decoder shall ignore any syntax element gps_extension_data that conforms to the value 1 for gps_extension_present in the GPS syntax structure.

FIG. 32 illustrates a data unit header according to embodiments.

FIG. 32 may correspond to a slice header contained in the bitstream of FIG. 30.

ref_frame_id: may indicate the index of the reference frame used for PU prediction.

Mv_depth_start and mv_depth_end: Indicate the start and end of the octree depth at which the motion vector may be delivered.

The data unit may further include the following.

gdu_geometry_parameter_set_id indicates the value of the active GPS gps_geom_parameter_set_id.

gdu_reserved_zero_3bits shall be equal to 0 in bitstreams conforming to this version of this document. Other values of gdu_reserved_zero_3bits are reserved for future use by ISO/IEC. Decoders shall ignore the value of gdu_reserved_zero_3bits.

slice_id identifies the slice to be referenced by other syntax elements.

slice_tag may be used to identify one or more slices with a specific value of slice_tag. When there is a tile inventory data unit, slice_tag is the tile ID. Otherwise, when there is no tile inventory data unit, the interpretation of slice_tag is specified by external means.

frame_ctr_lsb indicates the least significant bit of frame_ctr_lsb_bits of the frame number counter. Consecutive slices with different values of frame_ctr_lsb form part of different output point cloud frames. Consecutive slices with the same value of frame_ctr_lsb without intermediate frame boundary marker data units form part of the same coded point cloud frame.

It is a requirement of bitstream conformance that each coded point cloud frame should have a unique value of FrameCtr.

slice_entropy_continuation equal to 1 indicates that the entropy syntax analysis state restoration process (XREF) shall be applied to the GDU and all ADUs of the slice. slice_entropy_continuation equal to 0 specifies that the entropy syntax analysis of the GDU and ADUs of the slice is independent of that of the other slices. When not present, slice_entropy_conversation is inferred to be 0. When the GDU is the first DU in the coded point cloud frame, it is a requirement of bitstream conformance that slice_entropy_ continuation is equal to 0.

The prev_slice_id is equal to the value of slice_id of the preceding GDU in the bitstream order. The decoder shall ignore slices in which prev_slice_id is present and not equal to the value of slice_id of the preceding slice.

It is recommended that slice_entropy_continuation should not be equal to 1 if slice_tag is not equal to slice_tag of the GDU identified by prev_slice_id.

slice_geom_origin_log 2_scale indicates the scaling factor of the slice origin. When not present, slice_geom_origin_ log 2_scale is inferred to be gps_geom_origin_log 2_scale.

slice_geom_origin_bits_minus1 plus 1 indicates the length in bits of each syntax element slice_geom_origin_xyz [k].

slice_geom_origin_xyz[k] indicates the k-th component of the quantized coordinates (x, y, z) of the slice origin.

slice_angular_origin_bits_minus1 plus 1 indicates the length of each syntax element slice_angular_origin_xyz[k] in bits.

slice_angular_origin_xyz[k] specifies the k-th component of the coordinates (x, y, z) of the origin used for processing in the angular coding mode. When not present, slice_angular_origin_xyz[k] is inferred to be 0.

occtree_depth_minus1 plus 1 indicates the maximum number of tree levels in the coded occupancy tree. When occtree_coded_axis_list_present is equal to 0, the occupancy tree root node size is a cubic volume with an edge length of 1<<(occtree_depth_minus1+1).

Terminating a subtree earlier may result in a lower coded tree level than the maximum.

occtree_coded_axis[lvl][k] indicates whether the k-th axis is encoded by a tree node at occupied tree level lvl. occtree_coded_axis is used to determine the node volume dimension at each level of the occupancy tree. When not present, occtree_coded_axis[lvl][k] is inferred to be 1.

It is a requirement of bitstream conformance that the following condition is true.

The log 2 dimension of the root node is less than or equal to MaxSliceDimLog2.

The largest log 2 dimension of the root node is greater than occtree_depth_minus1−4.

occtree_stream_cnt_minus1 plus 1 indicates the maximum number of entropy streams used to code the occupancy tree. When occtree_stream_cnt_minus1 is greater than 0, each of the last occtree_stream_cnt_minus1 tree levels is contained in a separate entropy stream.

The variable OcctreeEntropyStreamDepth is derived as follows.

OcctreeEntropyStreamDepth=occtree_depth_minus1−
occtree_stream_cnt_minus1 slice_geom_qp_offset indicates the offset to geom_initial_qp. When not present, slice_geom_qp_offset is inferred to be 0.

slice_ptree_qp_period_log 2_offset indicates the offset to the base frequency for signaling the predictive tree node QP offset. When not present, slice_ptree_qp_period_log 2_offset is inferred to be 0.

The variable PtnQpInterval is the number of nodes between offsets.

PtnQpInterval=1<<ptree_qp_period_log 2+slice_ptre-
e_qp_period_log 2_offset ptn_residual_abs_log 2_bits[k] indicates the number of bits used to code the k-th component of the syntax element ptn_residual_abs_log 2.

ptn_radius_min indicates the minimum of the radius. When not present, ptn_radius_min is inferred to be 0.

adu_attr_parameter_set_id indicates the value of the active APS aps_attr_parameter_set_id.

adu_reserved_zero_3bits shall be equal to 0 in bitstreams conforming to this version of this document. Other values of adu_reserved_zero_3bits are reserved for future use by ISO/IEC. The decoder shall ignore the value of du_reserved_zero_3bits.

adu_sps_attr_idx identifies the attribute coded as the index of the active SPS attribute list. Its value is in the range of 0 to num_attributes−1.

An attribute coded by an ADU has a maximum of three components when attr_coding_type is not equal to 3.

```
AttrIdx = adu_sps_attr_idx
AttrDim = attr_components_minus1 [adu_sps_attr_idx] + 1
AttrBitDepth = attr_bitdepth_minus1 [adu_sps_attr_idx] + 1
AttrMaxval = (1 << AttrBitDepth) − 1
``` adu_slice_id indicates the value of the preceding GDU slice_id.

lod_dist_log 2_offset indicates the offset used to derive the initial slice subsampling factor used to generate the level of detail. When not present, lod_dist_log 2_offset is inferred to be 0.

last_comp_pred_coeff_diff[i] indicates the delta scaling value for the predicted value of the last component of the i-th detail layer in the second component of the multicomponent attribute. When last_comp_pred_coeff_diff[i] is not present, it is inferred to be 0.

The array LastCompPredCoeff with elements LastCompPredCoeff[i] with i=0 . . . lod_max_levels_minus1 is derived as follows:

```
initCoeff = last_comp_pred_enabled << 2
(i = 0; i <= lod_max_levels_minus1; i++) {
predCoeff = !i ? initCoeff : LastCompPredCoeff[i − 1]
LastCompPredCoeff[i] = predCoeff + last_comp_pred_coeff_diff[i]
}
```

For all i, the value of LastCompPredCoeff[i] is in the range of −128 to 127.

The inter_comp_pred_coeff_diff[i][c] indicates the k-th delta scaling value of the predicted value of the non-primary component of the i-th detail layer in the primary component of the multicomponent attribute. When inter_comp_pred_coeff_diff[i][c] is not present, it is inferred to be 0.

The array InterCompPredCoeff with elements InterCompPredCoeff[i][c] with i=0 . . . lod_max_levels_minus1 and c=1. AttrDim 1 is derived as follows:

```
initCoeff = inter_comp_pred_enabled << 2
(i = 0, i <= lod_max_levels_minus1, i++)
(c = 1; c < AttrDim; c++) {
predCoeff = !i ? initCoeff : InterCompPredCoeff[i − 1][c]
InterCompPredCoeff[i][c] = predCoeff + inter_comp_pred_coeff_diff[i][c]
}
```

The value of InterCompPredCoeff[i] is in the range of −128 . . . 127 for all i.

attr_qp_offset[ps] indicates the slice offset used to derive the QP for the primary (ps=0) and secondary (ps=1) attribute components. When not present, the value of attr_qp_offset [ps] is inferred to be 0.

attr_qp_layers_present equal to 1 indicates that a layer-specific QP offset is present in the current DU. attr_qp_layers_present equal to 0 indicates that no such offset is present.

attr_qp_layer_cnt_minus1 plus 1 indicates the number of layers for which the QP offset is signaled. When attr_qp_layer_cnt_minus1 is not present, the value of attr_qp_layer_cnt_minus1 is inferred to be 0.

attr_qp_layer_offset[layer][ps] indicates the layer offset used to derive the QP for the primary (ps=0) and secondary (ps=1) attribute components. When not present, the value of attr_qp_layer_offset[layer][ps] is inferred to be 0.

The AttrQpP[layer] and AttrQpOffsetS[layer] expressions indicate the QP of the primary attribute component and the QP offset of the secondary attribute component before adding a region-based QP offset.

AttrQpP[layer]:=
attr_initial_qp_minus4+4+attr_qp_offset[0]+attr_qp_layer_offset[layer][0]

AttrQpOffsetS[layer]:=
attr_secondary_qp_offset+attr_qp_offset[1]+attr_qp_layer_offset[layer][1]

attr_qp_region_cnt indicates the number of spatial regions within the current slice that have the signaled region QP offset.

attr_qp_region_origin_bits_minus1 plus 1 indicates the length in bits of each of the syntax elements attr_qp_region_origin_xyz and attr_qp_region_size_minus1_xyz.

attr_qp_region_origin_xyz[i][k] and attr_qp_region_size_minus1_xyz[i][k], if present, indicate the i-th spatial region of the slice coordinate system to which attr_qp_region_offset[i][c] applies.

attr_qp_region_origin_xyz[i][k] indicates the k-th component of the origin coordinates (x, y, z) of the i-th region with respect to the slice origin.

attr_qp_region_size_minus1_xyz[i][k] plus 1 indicates the k-th component of the width, height, and depth of the i-th region.

The arrays AttrRegionQpOriginStv[i][k] and AttrRegionQpSizeStv[i][k] with values AttrRegionQpOriginStv and AttrRegionQpSizeStv are presented in coded geometry axis order for i=0 . . . attr_qp_region_cnt−1 and k=0 as follows:

```
if (!attr_coord_conv_enabled) {
AttrRegionQpOriginStv[i][XyzToStv[k]] =
attr_qp_region_origin_xyz[i][k]
```

-continued

```
AttrRegionQpSizeStv[i][XyzToStv[k]] =
attr_qp_region_size_minus1_xyz[i][k] + 1
}
``` attr_qp_region_origin_rpi[i][k] and attr_qp_region_size_minus1_rpi[i][k] indicate the i-th spatial region in the current slice in the attribute angular coordinate system to which attr_qp_region_offset[i][c] applies.

attr_qp_region_origin_rpi[i][k] is the k-th component of the coding coordinates of the i-th region with respect to the angular origin.

attr_qp_region_size_minus1_rpi[i][k] plus 1 is the k-th component of the region radius, azimuth, and beam index i.

```
if (attr_coord_conv_enabled) {
AttrRegionQpOriginStv[i][k] = attr_qp_region_origin_rpi[i][k]
AttrRegionQpSizeStv[i][k] = attr_qp_region_size_minus1_rpi[i][k] + 1
}
```

It is a requirement of bitstream conformance that the following condition is true for k=0 . . . 2.

AttrRegionQpOriginStv[i][k]+AttrRegionQpSizeStv[i][k]<(1<<MaxSliceDimLog2)

attr_qp_region_offset[i][ps] specifies the offset used to derive the QP for the primary (ps=0) and secondary (ps=1) attribute components of points positioned within the region defined by AttrRegionQpOriginStv[i] and AttrRegionQpSizeStv[i.]. When not present, attr_qp_region_offset[i][ps] is inferred to be 0.

FIG. 33 illustrates a data unit according to embodiments. FIG. 33 corresponds to a data unit of the bitstream of FIG. 30.

Split_flag: When equal to 1, it may indicate that the motion vector for the node is delivered after the child is split. When the flag is equal to 0, the motion vector for the node may be delivered.

Population_flag: When equal to 1, it may indicate whether a node that is not split is occupied.

Motion_vector: may indicate the motion vector for each axis.

Occupancy_map: The occupancy map of each node may be delivered. It may be delivered on a bit-by-bit or byte-by-byte basis.

FIG. 34 illustrates a point cloud data transmission device according to embodiments.

The transmission device shown in FIG. 34 may correspond to transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoders of FIGS. 15 and 34, the encoding of FIG. 36, and the transmission method of FIG. 38.

The operations of the described embodiments may be performed by the components of a prediction-based point cloud compression transmission/reception device/method according to the embodiments. Each component according to the embodiments may correspond to hardware, software, processors, and/or a combination thereof.

A point cloud attribute compression method according to embodiments may be implemented as follows. While the embodiments describe a method of compressing attribute information about point cloud data, the method according to the embodiments may be similarly applied in position information compression and other compression methods.

The configuration and/or operation of a point cloud encoder, e.g., a geometry encoder or an attribute encoder, of the transmission device according to embodiments may be as follows.

FIG. 34 is an embodiment of a transmitter performing compression based on inter-frame correlation. For the current frame, an occupancy pattern may be generated to find a relationship between the node to be compressed and neighbor nodes. Based on the similarity between the current frame and an adjacent frame, a predicted node similar to the node to be compressed (in the current frame) may be found in a reference frame (an adjacent frame, encoded or decoded prior to the current frame). In this regard, based on the methods according to embodiments, the accuracy of motion prediction may be improved by not only finding the similarity based on the difference between the node to be compressed and the predicted node, but also considering the difference between the neighbors of the node to be compressed and the neighbors of the predicted node. Once the position of the predicted node is determined based on the motion vector, an occupancy pattern may be generated based on the occupancy information about the neighbors of the predicted node. In particular, when inter_predicted_neighbor_child_occupancy_type=0, an intra-frame child neighbor touching pattern may be obtained for neighbors at the left, bottom, and front positions for the current frame, and an inter-frame child neighbor touching pattern may be obtained for neighbors in the right, top, and back positions for the predicted frame. When inter_predicted_neighbor_child_occupancy_type=1, a 6-neighbor touching pattern may be considered based on the occupancy of sibling nodes belonging to the predicted parent node. When inter_predicted_neighbor_child_occupancy_type=2, a 6-neighbor touching pattern may be considered based on a child neighbor and sibling occupancy of the predicted frame without any information about the current frame. The occupancy pattern may be used as additional information for selecting a context table, or a context table may be selected based on the degree of match based on a comparison with the neighbor pattern of the node to be compressed. Entropy coding may be performed based on the selected context table. A context table may be selected based on inter_predicted_neighbor_child_occupancy_type. inter_predicted_neighbor_child_occupancy_type may indicate a method to consider the relationship between the predictor and the neighbor nodes thereof. When equal to 0, it may be defined as considering the predictor neighbor pattern. When equal to 1, it may be defined as using the comparison pattern of the predictor neighbor pattern and the current node neighbor pattern. When equal to 2, it may be defined as using the number of matching nodes for the predictor neighbor pattern and the PU neighbor pattern. When equal to 3, it may be defined as using the number of nodes whose positions match among the occupied neighbors of the predictor and the PU. When equal to 4, it may be defined as the number of nodes whose positions match among the unoccupied neighbors of the predictor and the PU. The calculation of the score according to each method is performed as described with reference to FIG. 24. The score for each relationship may be calculated to select the most efficient method to perform encoding/decoding.

An intra-frame child neighbor pattern controller (or processor) may receive point cloud data. The point cloud data may include geometry data and/or attribute data. The intra-frame child neighbor pattern controller may generate a child neighbor touching pattern for neighbor nodes at left/bottom/front positions within the current frame (see FIGS. 25 and 26).

A motion estimator (or processor) may receive a reference frame for the current frame. The reference frame may be a frame encoded prior to the current frame. Based on the reference frame, the motion estimator may find a corresponding predictor for prediction of the current frame and estimate a motion vector for the predictor.

A motion compensator (or processor) may generate prediction data for the current node in the current frame based on the estimated motion vector (see FIG. 20).

The intra-frame child neighbor pattern controller (or processor) may search for a child neighbor pattern in an inter-frame (referred to as an adjacent frame, a reference frame, a previous frame, a predicted frame, or the like). It may search for an intra-frame child neighbor touching pattern for neighbors positioned on the right/top/back of the corresponding node in the predicted frame (see FIGS. 27 to 29).

An inter-intra neighbor touching pattern controller (or processor) may generate a touching pattern according to FIGS. 25 to 29 based on the inter-frame child neighbor pattern for the current frame and the inter-frame child neighbor pattern for the reference frame.

A context table selector (or processor) may generate a context table for entropy coding based on the touching pattern. The selector may generate the most appropriate context table using the comparison method according to FIGS. 23 and 24 or the like based on the touching pattern.

An entropy encoder may encode the point cloud data based on the selected context according to an entropy method. Then, a bitstream containing the encoded geometry data and/or attribute data may be generated.

For a description of the motion estimator, reference may be made to FIG. 20.

For a description of the motion compensator, reference may be made to FIG. 20.

For a description of the intra-frame child neighbor pattern part, reference may be made to FIG. 25.

For a description of the inter-frame child neighbor pattern part and the inter-intra neighbor touching pattern part, reference may be made to FIGS. 27 to 29.

For the inter-intra neighbor touching pattern, a final touching pattern may be generated by combining the intra-frame child neighbor pattern, such as green, and the inter-frame child neighbor pattern, such as yellow.

FIG. 35 illustrates a point cloud data reception device according to embodiments.

The device of FIG. 35 may perform a reverse process to the operation of the transmission device of FIG. 34. Each component according to the embodiments may correspond to hardware, software, a processor, and/or a combination thereof.

An embodiment of a receiver for compression based on inter-frame correlation according to embodiments is described below. When a bitstream is acquired, the data unit header and data unit are decoded to acquire information such as a motion vector and a reference frame ID. Based on the information, the decoded previous frame is selected and a node in the position and range specified by the motion vector is selected as a predicted node. Also, the neighbor pattern may be checked by determining the occupancy information for the neighbor nodes in the specified range. When inter_predicted_neighbor_child_occupancy_type=0, the intra-frame child neighbor touching pattern may be obtained for neighbors at the left, bottom, and front positions for the current frame, and the inter-frame child neighbor touching pattern may be obtained for neighbors at the right, top, and back positions for the predicted frame. When inter_predicted_neighbor_child_occupancy_type=1, a 6-neighbor touching pattern may be considered based on the occupancy of sibling nodes belonging to the predicted parent node. When inter_predicted_neighbor_child_occupancy_type=2, a 6-neighbor touching pattern may be considered based on occupancy of the child neighbor and sibling of the predicted frame without information about the current frame. Once the neighbor pattern of the predicted node and the neighbor pattern of the node to be restored are generated, a context table is selected based on the respective occupancy patterns to perform entropy decoding.

A motion vector-based tree generator may receive a bitstream. The motion vector-based tree generator may generate a tree from the point cloud data contained in the bitstream based on the motion vector applied at the transmitting side.

An intra-frame child neighbor pattern generator (or processor) may generate a child neighbor pattern for the current node to reconstruct data in the current frame.

A motion compensator (or processor) may receive a reference frame containing similar information to the current frame. The reference frame may be a frame decoded prior to the current frame. The motion compensator may receive reference frame identification information and a motion vector from a parameter contained in the bitstream. The motion compensator may generate a predicted value for the current node to be restored based on the motion vector.

An inter-frame child neighbor pattern generator (or processor) may generate a child neighbor pattern from a corresponding reference frame to restore a node of a depth of the tree in the current frame.

An inter-intra neighbor touching pattern generator (or processor) may generate a neighbor touching pattern based on the intra-frame child neighbor pattern and/or the inter-frame child neighbor pattern.

A context table selector (or processor) may select a context table for entropy coding based on the neighbor touching pattern. The selection of the context table based on the neighbor touching pattern may conform to the description above.

An entropy decoder may decode the point cloud data in an entropy manner based on the selected context. Thereby, geometry data and/or attribute data of the point cloud data may be reconstructed.

FIG. 36 illustrates a point cloud data transmission method according to embodiments.

FIG. 36 is a flowchart related to the operations of the device of FIG. 35.

A flowchart of a transmitter for compression based on inter-frame correlation according to embodiments is described below. After attribute matching is completed for an octree node, the method/device according to the embodiments performs motion prediction and compensation in consideration of the occupancy patterns of neighbor nodes for the depth range (depthStart, depthEnd) in which the prediction is performed. Then, it determines whether to perform motion prediction based on an internal parameter parentSplitFlag, which indicates whether the parent node has been split. For all nodes belonging to depthStart, prediction is performed from depthStart assuming that parentSplitFlag=1. When parentSplitFlag is 1 for an occupied node (population_flag=1), position-attribute-based motion prediction according to embodiments is performed, and motion compensation is performed on the motion vector acquired at this time to acquire, from the reference frame, a predictor similar to the current node. At this time, the cost of delivering the motion vector is compared with the cost of proceeding with the splitting without delivering the motion vector. If the cost of delivering the MV is smaller than the other cost, the splitting is not performed and the inter-frame attribute prediction is performed based on the predictor used in the case of using the motion vector, and parentSplitFlag is set to the value of 0. In the opposite case, splitting is performed, and therefore split_flag=1 is defined and the compression is not performed. A neighbor pattern is acquired for the predicted node acquired through the motion compensation, and a neighbor occupancy score is calculated by comparing the acquired neighbor pattern with the neighbor pattern of the current node. At this time, an intra-frame child neighbor pattern may be acquired for neighbors at the left, front, and bottom positions, and an inter-frame child neighbor pattern may be acquired for neighbors at the right, back, and top positions. Also, in the case where a sibling occupancy pattern is used, a neighbor pattern may be acquired based on the inter-frame child occupancy. By aggregating the information, an inter-intra child neighbor touching pattern may be obtained, and a context table for entropy coding may be selected based on the obtained pattern.

The method/device according to embodiments determines a range between a depth start and a depth end. When the current depth is less than or equal to the depth end, inter-frame prediction may be performed. When the current depth is greater than the depth end, an intra-frame child neighbor pattern may be generated to encode an occupancy map based on the neighbor context according to the child neighbor touching pattern.

To perform intra-frame prediction, it is checked whether the parent split flag is equal to 1 for occupied nodes. If the parent split flag is not equal to 1, the parent split flag for the children may be 0, and an intra-frame child neighbor pattern and a child neighbor touching pattern may be generated to encode the occupancy map based on the neighbor context.

When the parent split flag is equal to 1, motion estimation may be performed based on the neighbor patterns. Motion compensation may be performed based on the estimated motion. An inter-frame child neighbor pattern may be generated, a child neighbor touching pattern may be generated, and an occupancy map may be encoded for the neighbor contexts based on the touching pattern. The process is performed for all nodes at the current depth. When the prediction for all nodes at the current depth is completed, it is determined whether the current depth is the maximum depth and the process is terminated.

FIG. 37 illustrates a point cloud data reception method according to embodiments.

FIG. 37 is a flowchart related to the operations of the device of FIG. 36.

The flowchart of a receiver for a compression method based on inter-frame prediction according to embodiments is described below. The receiver may define an internal parameter ParentReconFlag to indicate whether the parent node has been decoded. That is, when ParentReconFlag is equal to 1, the attribute may be restored using the in-frame attribute predicted value. When ParentReconFlag is equal to 0, there may be an MV for the current node. Within the receiver, split flag of the delivered signal may be checked to determine whether to perform decoding. When split flag is equal to 1, additional splitting is performed and the MV is not delivered. On the other hand, when split flag is equal to 0, attribute prediction may be performed using a prediction block with compensated motion within the frame specified by reference_frame_id. A neighbor pattern may be acquired for the predicted nodes acquired through motion compensation, and an inter-frame child neighbor pattern may be acquired based on the acquired pattern. Similarly, an intra-frame child neighbor pattern may be acquired based on the neighbor information in the current frame. A child neighbor touching pattern may be obtained based on each child neighbor pattern, and a context table for entropy decoding may be selected based on the child neighbor context.

When the current depth is less than or equal to the depth end, the reception method/device according to embodiments may perform intra prediction. When the current depth is greater than the depth end, the reception method/device may generate an intra-frame child neighbor pattern and decode the occupancy map using the neighbor context according to the child neighbor touching pattern.

When parentReconFlag is not equal to 0 for an occupied node, an intra-frame child neighbor pattern may be generated and the occupancy map may be decoded using the neighbor context according to the child neighbor touching pattern. When parentReconFlag is equal to 0 and Split_flag is equal to 0 for an occupied node, an inter-frame child-neighbor pattern may be generated for the nodes at the current depth, and the occupancy map may be decoded using the neighbor context according to the child neighbor touching pattern. When Split_flag is not equal to 0, the above process is performed for the next node at the current node. When the current depth is not the maximum depth, the process is repeated for the nodes at the depth. When the current depth is the maximum depth, the process is terminated.

FIG. 38 illustrates a point cloud data transmission method according to embodiments.

A method of transmitting point cloud data according to embodiments may include encoding point cloud data (S3800).

The encoding operation according to the embodiments may include the operations of the transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the motion estimation of FIGS. 15 and 16, the splitting of nodes in the depth of FIGS. 17 and 19, the motion compensation of FIG. 20, and the encoding according to the neighbor occupancy pattern of FIGS. 21 and 24, the generation of the neighbor touching pattern and the encoding according to the neighbor touching pattern of FIGS. 25 to 29, the generation of the bitstream and parameters of FIGS. 30 to 33, and the context selection and encoding according to the intra-frame child neighbor pattern and/or inter-intra neighbor touching pattern within the depth range according to FIGS. 34 and 36.

The method of transmitting point cloud data according to the embodiments may further include transmitting a bitstream containing the point cloud data (S3810). The transmitting operation include bitstream transmission according to the transmitter 10003 of FIG. 1, the transmission 20002 of FIG. 2, the transmission processor 120212 of FIG. 12, the transmission of the bitstream and parameters of FIGS. 30 to 33, and the context selection and encoding according to the intra-frame child neighbor pattern and/or inter-intra neighbor touching pattern within the depth range according to FIGS. 34 and 36.

FIG. 39 illustrates a point cloud data reception method according to embodiments.

A method of receiving point cloud data according to embodiments may include receiving a bitstream containing point cloud data (S3900).

The receiving operation according to the embodiments may include the operations of the reception device 10004 of FIG. 1, the receiver 10005 of FIG. 1, the reception according to the transmission of FIG. 2, and the reception of the bitstream and parameters of FIGS. 30 to 33.

The method of receiving point cloud data according to the embodiments may further include decoding the point cloud data (S3910).

The decoding operation according to the embodiments may include the operations of the point cloud video decoder 10006 of FIG. 1, the decoding 20003 of FIG. 2, the decoders of FIGS. 10 and 11, the reception device of FIG. 13, the XR device 1430 of FIG. 14, the motion estimation of FIGS. 15 and 16, the parsing of the split and occupancy flags for the nodes in the depth of FIGS. 17 and 19, the motion compensation of FIG. 20, and the decoding according to the neighbor occupancy patterns of FIGS. 21 and 24, the generation of the neighbor touching pattern and the decoding according to the neighbor touching pattern of FIGS. 25 to 29, the parsing of the bitstream and parameters of FIGS. 30 to 33, and the context selection and decoding according to the intra-frame child neighbor pattern and/or inter-intra neighbor touching pattern within the depth range according to FIGS. 34 and 36.

Regarding FIG. 1, the transmission method according to embodiments may include encoding point cloud data; and transmitting a bitstream containing the point cloud data.

Regarding the PU and neighbors belonging to the current frame and the predictor and neighbors belonging to the reference frame shown in FIG. 15, the encoding of the point cloud data may include generating, based on the reference frame for the current frame, prediction data for a prediction unit (PU) for the point cloud data contained in the current frame, wherein the reference frame may include a search window, and wherein similar data for the point cloud data contained in the PU may be generated from the point cloud data included in the search window.

With respect to the motion vector animation and compensation shown in FIG. 16, the motion vector V may be generated based on a difference between a block B in the PU and a predictor P in the reference frame. For example, the encoding of the point cloud data may include generating a predicted value for the PU based on the predictor and neighbors of the predictor included in the search window and the point cloud data and neighbors of the point cloud data included in the PU, and generating a motion vector based on the predicted value and the PU. Here, the predictor with the smallest difference between the PU and the prediction candidate in the reference frame may be generated as the predicted value. In other words, the motion vector may be generated from the predictor in the reference frame that is most similar to the current node.

Regarding the split and population shown in FIG. 17, the encoding of the point cloud data may include generating a motion vector at a depth of the tree containing the point cloud data, or generating a motion vector at a lower depth of the depth, wherein the motion vector for the lower depth may be generated based on the split and occupancy for the lower depth. Here, whether to split to the lower depth may be determined in a cost-effective manner by comparing the cost between the current depth and the lower depth.

Regarding the motion vector and predictor shown in FIG. 20, the predicted value B' for block B of the current node may be generated from the difference between the predictor P and the motion vector V. For example, the encoding of the point cloud data may include predicting the point cloud data of the PU based on the motion vector.

Regarding the neighbor occupancy patterns and neighbor occupancy comparison scores illustrated in FIGS. 21 to 23, the encoding of the point cloud data may include encoding the PU based on the neighbor occupancy pattern of the PU included in the search window, and comparing neighbor occupancy information related to the PU and neighbors of the PU with neighbor occupancy information related to the predictor and neighbors of the predictor.

Regarding the neighbor child occupancy patterns illustrated in FIGS. 25 and 26, the neighbor occupancy information may include a neighbor child occupancy pattern for a child node of a node of the PU. Here, the term "include" may mean that encoding is performed based on the neighbor child occupancy pattern in consideration of the neighbor occupancy information.

Regarding the predictor and current neighbor-based three neighbor children shown in FIG. 27, the neighbor occupancy information may include a neighbor child of the node for the child node of the node in the PU, and a neighbor child of the node in the reference frame. Here, the term "include" may mean that encoding is performed based on the neighbor child occupancy pattern in consideration of the neighbor occupancy information.

Regarding the six neighbor children based on a predictor, a current neighbor and a sibling illustrated in FIG. 28, the neighbor occupancy information may include a neighbor child of the node for a child node of the node in the PU, a neighbor child of the node in the reference frame, and a child node of the node in the reference frame. Here, the term "include" may mean that encoding is performed based on the neighbor child occupancy pattern in consideration of the neighbor occupancy information.

Regarding the six neighbor children based on a predictor and a sibling illustrated in FIG. 29, the neighbor occupancy information may include a neighbor child node of a node in a reference frame for a child node of a node in the PU, and a child node of the node in the reference frame. Here, the term "include" may mean that encoding is performed based on the neighbor child occupancy pattern in consideration of the neighbor occupancy information.

A transmission device performing the transmission method according to the embodiments may include an encoder configured to encode point cloud data; and a transmitter configured to transmit a bitstream containing the point cloud data.

A reception method corresponding to a reverse process of the transmission method may include receiving a bitstream containing point cloud data, and decoding the point cloud data.

A reception device performing the reception method may include a receiver configured to receive a bitstream containing point cloud data, and a decoder configured to decode the point cloud data.

Compression based on similarity between frames according to embodiments may be used to compress the point cloud data.

When using motion prediction based on neighbor occupancy patterns, the characteristics of neighbor nodes are considered together. Accordingly, motion prediction may be performed with greater sophistication.

In addition, by using the neighbor occupancy context in consideration of both the neighbor occupancy pattern of the predicted node and the neighbor occupancy pattern of the node to be coded, entropy coding may be performed by distinguishing between a case where the neighbor occupancy patterns are similar (e.g., high accuracy of motion estimation or high similarity of prediction) and a case where the contexts and patterns are different (e.g., low accuracy of motion estimation or low similarity of prediction). Accordingly, compression efficiency may be improved.

Thus, by considering not only intra-frame prediction but also the inter-frame data prediction mode, the point cloud data transmission device and encoder according to embodiments may efficiently compress the point cloud data. Similarly, the point cloud data reception device and decoder according to embodiments may receive a bitstream containing point cloud data and efficiently reconstruct the point cloud data based on signaling information in the bitstream and/or the decoding operation according to embodiments.

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/"and"," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method comprising:
   encoding geometry data of point cloud data based on an occupancy tree; and
   encoding attribute data of the point cloud data,
   wherein the encoding geometry data includes:
   predicting an occupancy for a node of the octree based on a reference frame; and
   obtaining an occupied neighborhood pattern for a child node of the node based on an occupancy of three neighboring child nodes for the child node, and
   wherein the encoded geometry data and the encoded attribute data are included in a bitstream,
   wherein the bitstream includes information for specifying whether or not neighbor prediction is enabled for the occupancy tree.

2. The method of claim 1, wherein the geometry data is predicted for a prediction unit (PU) based on a search window from the reference frame.

3. The method of claim 2, the encoding the geometry data comprises:
   generating a predicted value for the PU based on a predictor included in the search window, neighbors of the predictor, point cloud data contained in the PU, and neighbors of the point cloud data; and
   generating a motion vector based on the predicted value and the PU.

4. The method of claim 3, wherein the encoding the geometry data comprises:
   generating the motion vector at a depth of a tree containing the point cloud data; or generating a motion vector at a lower depth of the depth,
   wherein the motion vector for the lower depth is generated based on a split and occupancy for the lower depth.

5. The method of claim 3, wherein the encoding the geometry data comprises:
   predicting, based on the motion vector, the point cloud data in the PU.

6. A method comprising:
   obtaining a bitstream generated by:
   encoding geometry data of point cloud data based on an occupancy tree; and
   encoding attribute data of the point cloud data, wherein the encoding geometry data includes:
   predicting an occupancy for a node of the octree based on a reference frame; and
   obtaining an occupied neighborhood pattern for a child node of the node based on an occupancy of three neighboring child nodes for the child node, and
   wherein the encoded geometry data and the encoded attribute data are included in a bitstream, wherein the bitstream includes information for specifying whether or not neighbor prediction is enabled for the occupancy tree; and
   transmitting data for the point cloud data including the bitstream.

7. A method comprising:
   decoding geometry data of point cloud data in a bitstream based on an occupancy tree; and
   decoding attribute data of the point cloud data in the bitstream,
   wherein the decoding the geometry data includes:
   predicting an occupancy for a node of the occupancy tree based on a reference frame; and
   obtaining an occupied neighborhood pattern for a child node of the node based on an occupancy of three neighboring child nodes for the child node, and
   wherein the bitstream includes information for specifying whether or not neighbor prediction is enabled for the occupancy tree.

* * * * *